June 11, 1935.  R. E. HERSEY  2,004,607
TESTING SYSTEM
Filed April 13, 1934    13 Sheets-Sheet 1

INVENTOR
R. E. HERSEY
BY P. C. Smith
ATTORNEY

Patented June 11, 1935

2,004,607

UNITED STATES PATENT OFFICE 2,004,607

TESTING SYSTEM

Ralph E. Hersey, Madison, N. J., assignor to Bell Telephone Laboratories, Incorporated, New York, N. Y., a corporation of New York Application April 13, 1934, Serial No. 720,368

26 Claims. (Cl. 179—175.23)

This invention relates to testing arrangements for telephone systems and has for its object to facilitate the testing of the functions of register senders.

In the testing of register senders it is customary to transmit to the sender the digits comprising telephone designations and to receive these designation from the sender in the same or a translated form, which designations are compared with the designations transmitted and the continued operation of the test depends upon the correspondence of the designations. In accordance with the present invention, it is possible to successively transmit and receive each digit in turn or to transmit all of the digits before starting the reception of any digit. A keyset is provided for each digit and a pair of transfer relays for associating the keyset with both the transmitting and the receiving means, and these relays are either held operated while the transmitting and receiving means are made successively effective or are released as the transmitting means is associated with each keyset in turn and are then re-operated to associate the receiving means with each keyset in turn. Under certain conditions the sender delays the transmission of a digit until a subsequent digit has been received and the test circuit when testing this condition employs an auxiliary pair of relays which are operated for a measured time interval before the subsequent digit is transmitted to test the ability of the senders to wait for that digit.

Where register senders employ relay type impulsers, it is desirable to test the speed at which the impulses are generated. In accordance with the present invention means are provided for associating the sender impulser and the test circuit receiving means without involving the digit registers and other control equipment and the receiving means controls a lamp by means of which the speed of pulsing may be determined.

Figure 1:
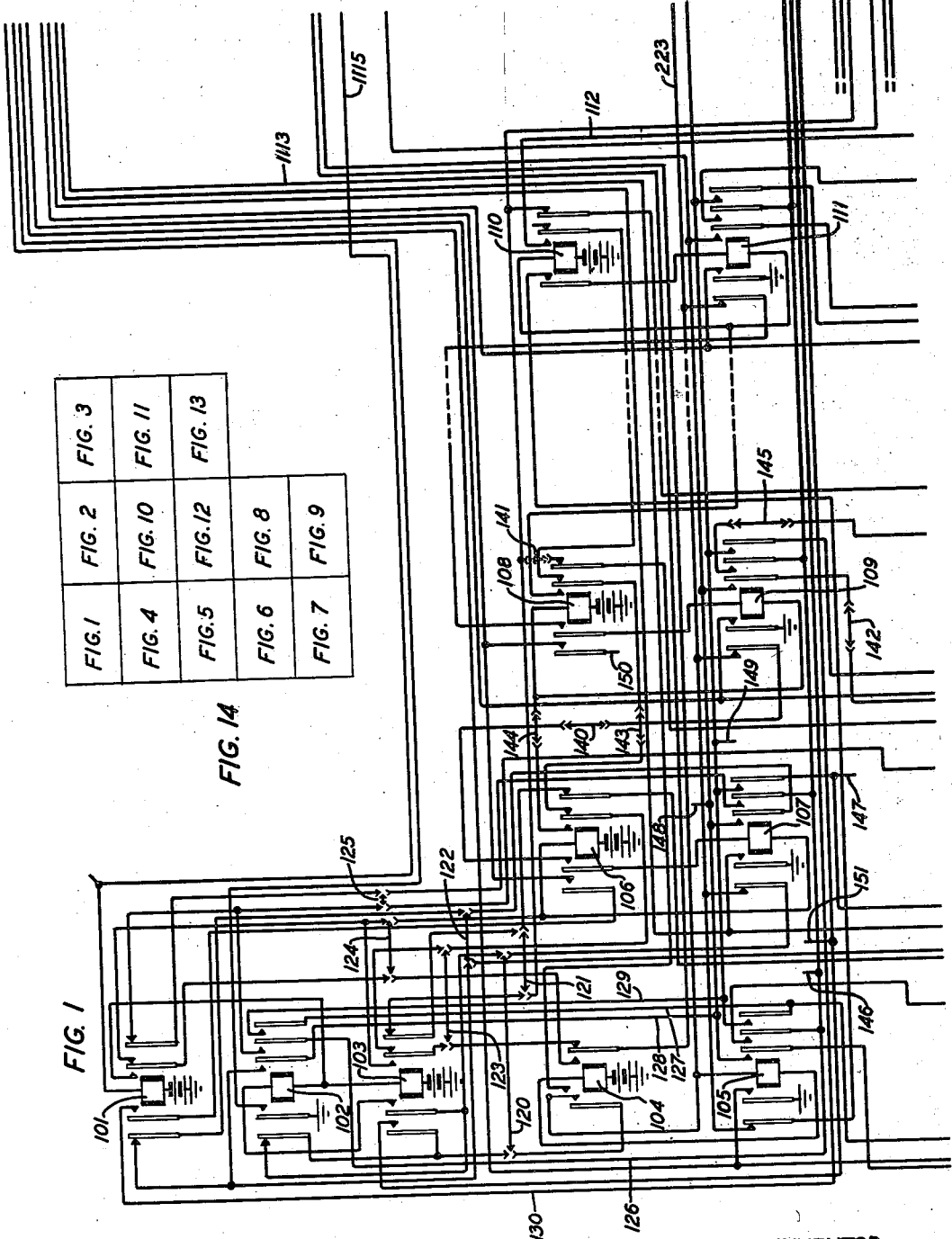
Figure 2:
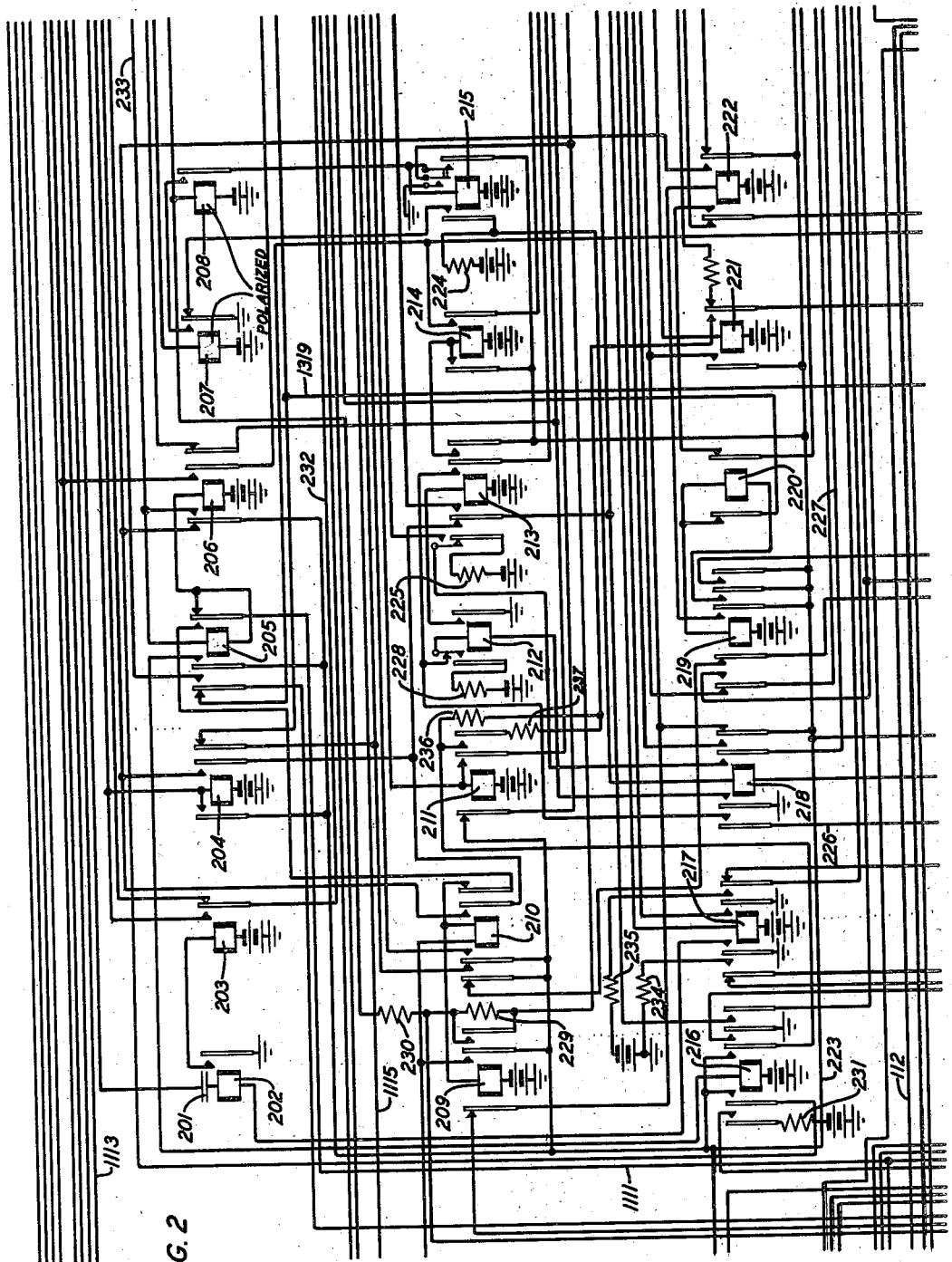
Figure 3:
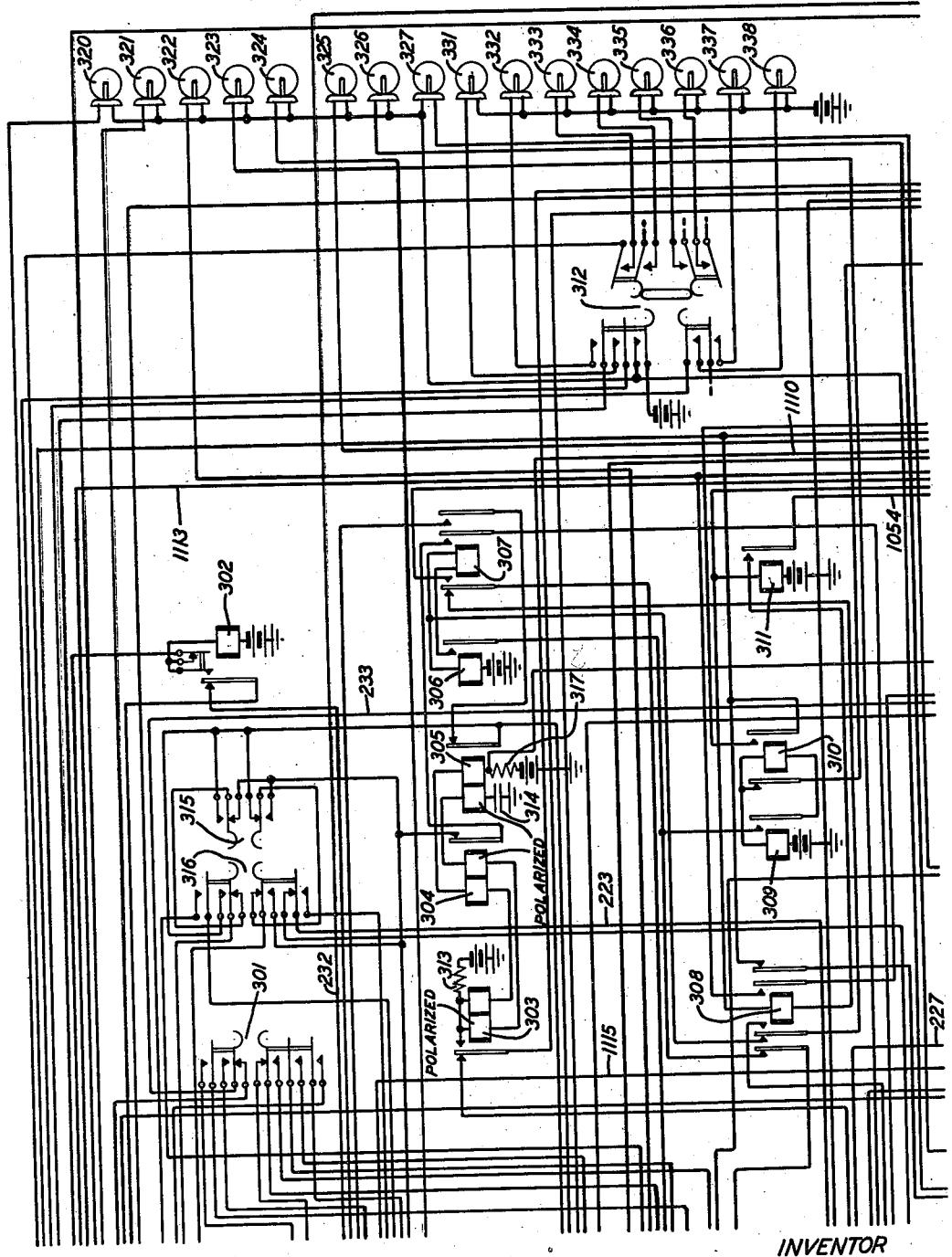
Figure 4:
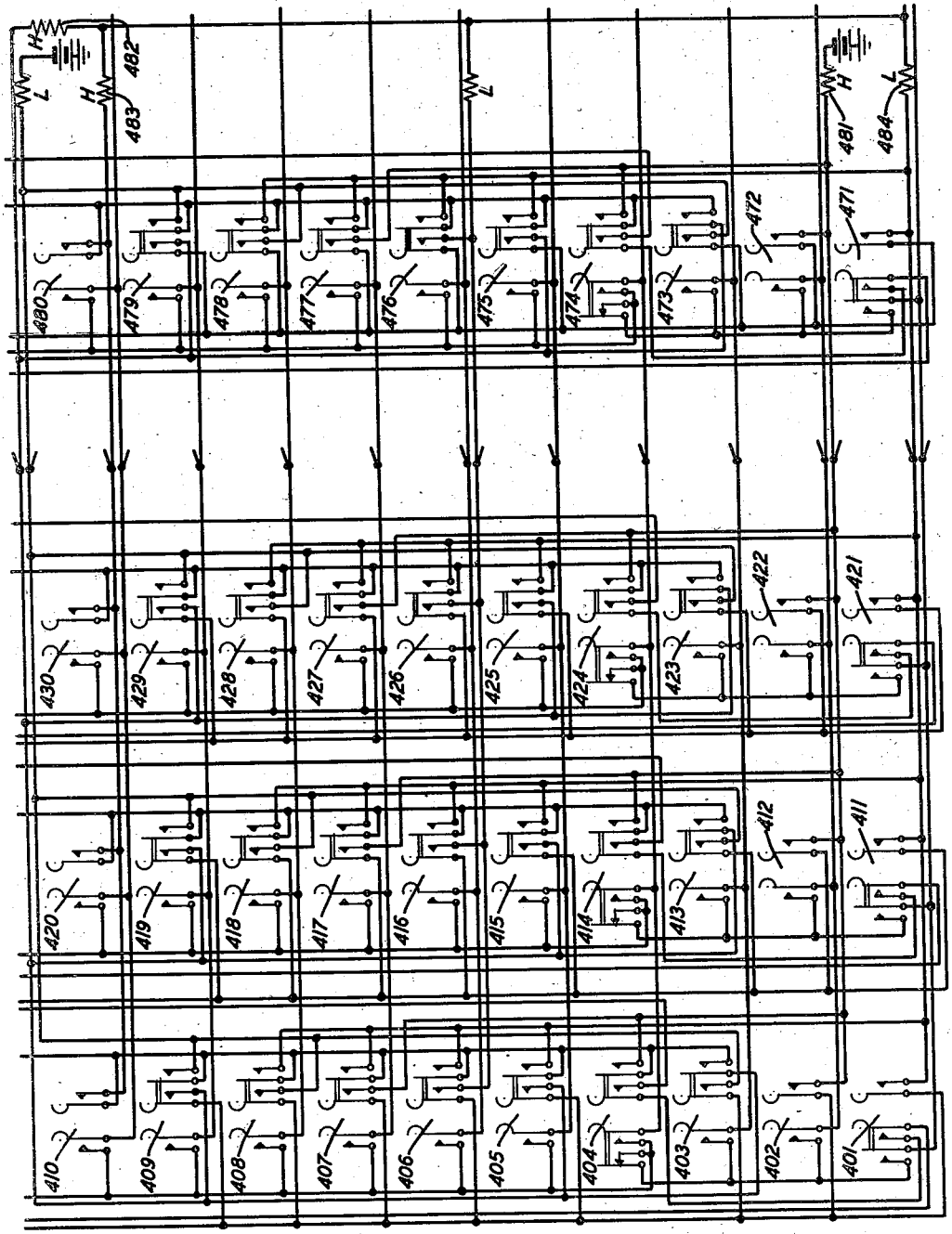
Figure 5:
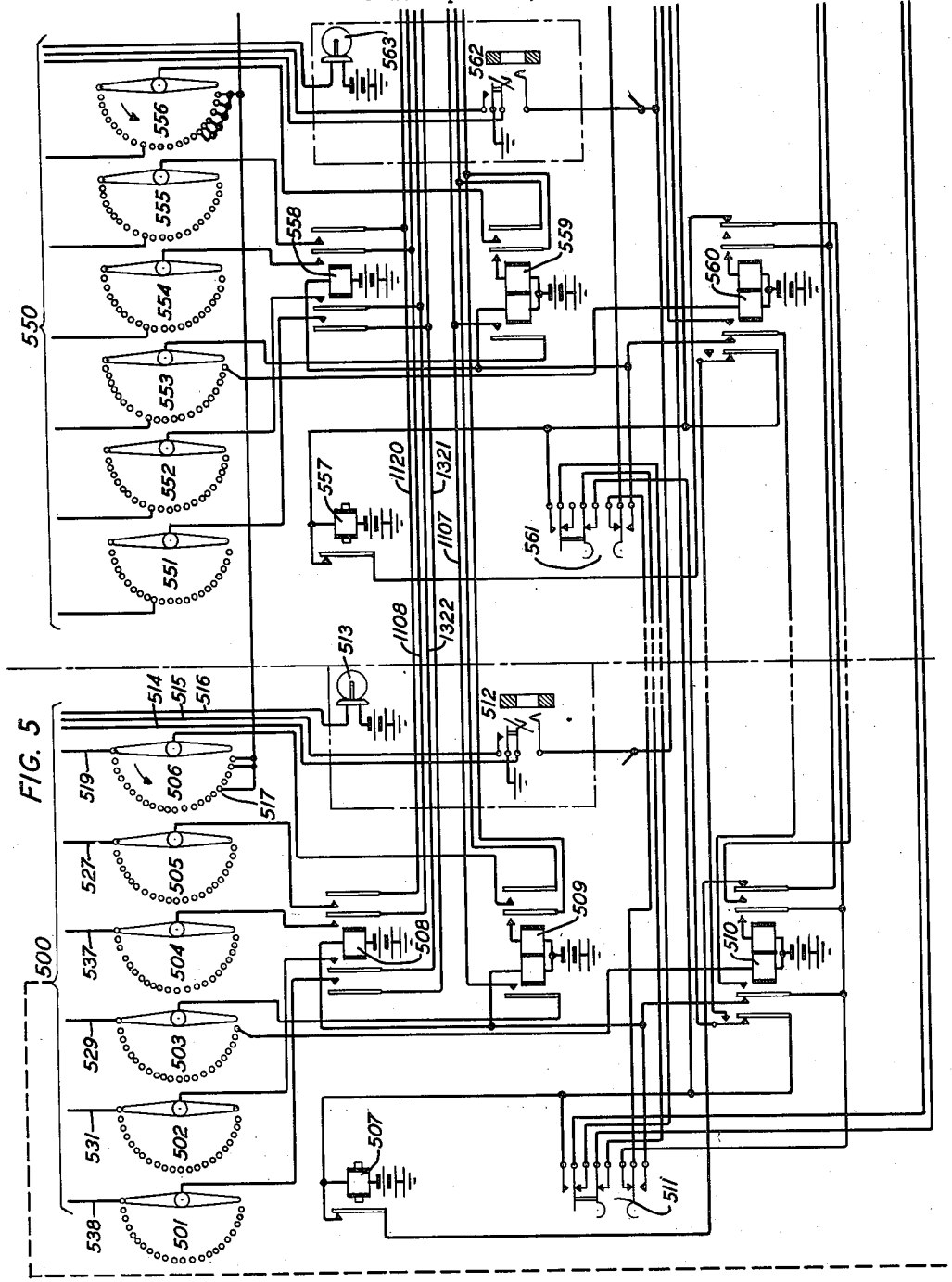
Figure 6:
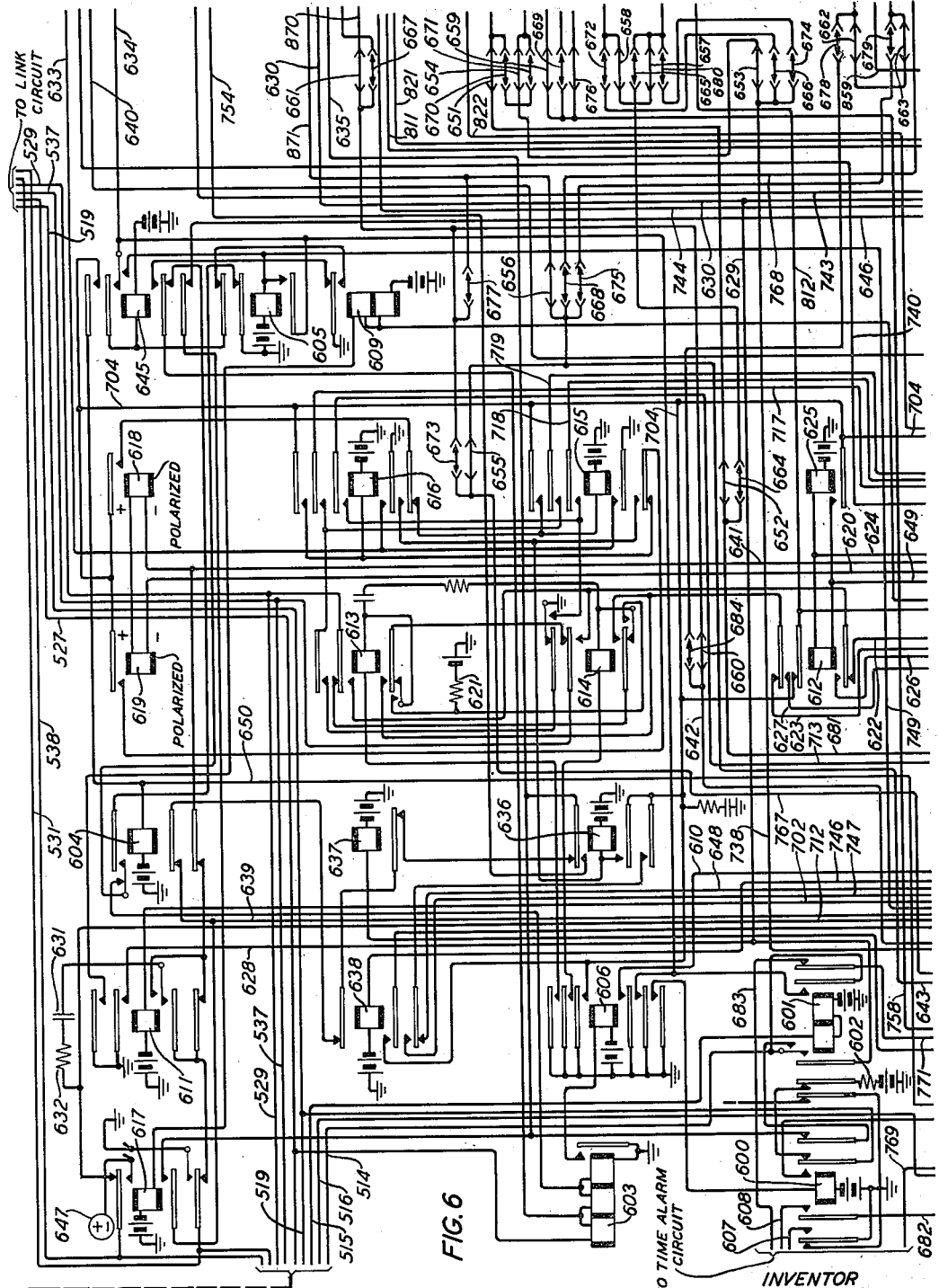
Figure 7:
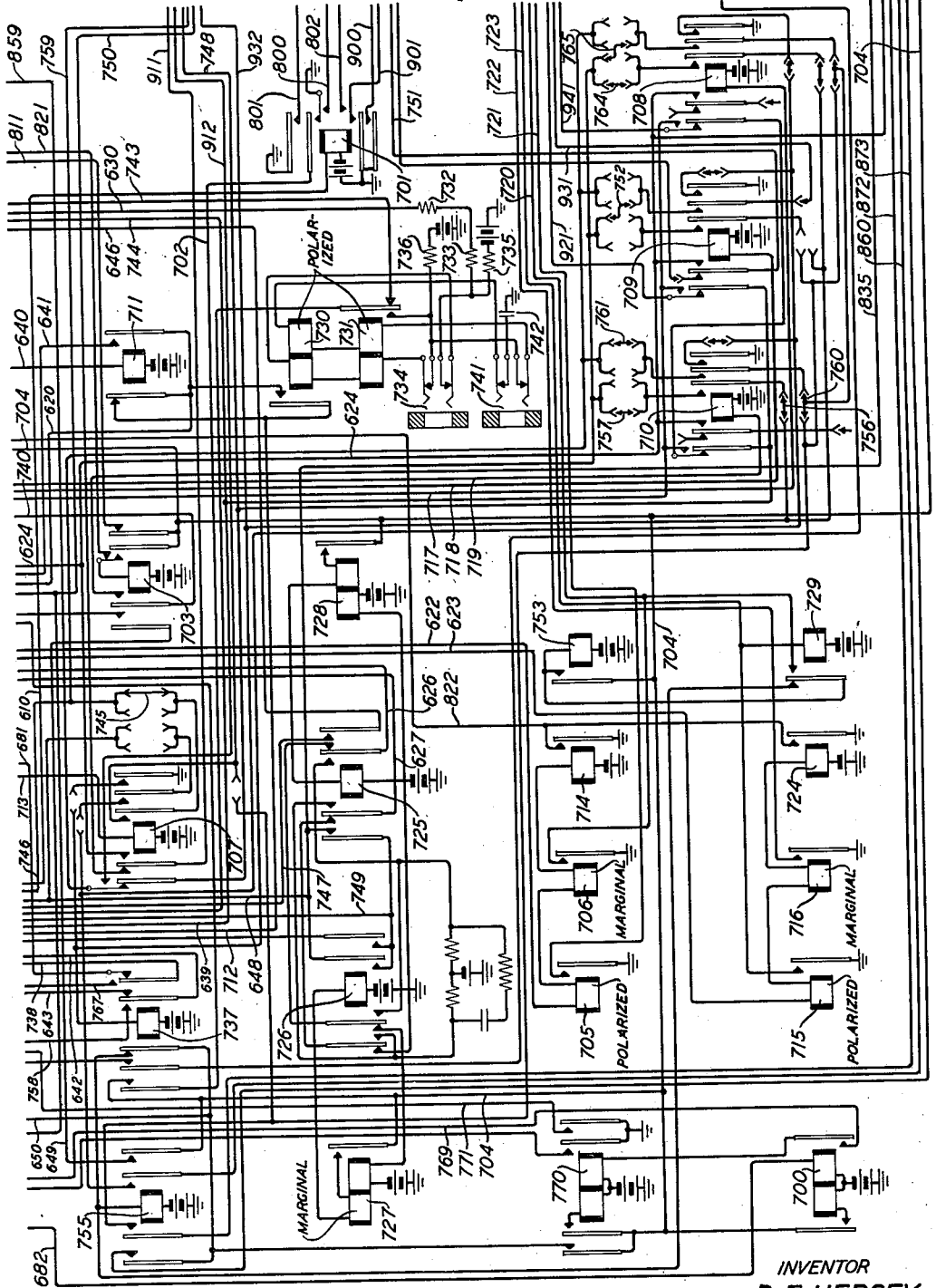
Figure 8:
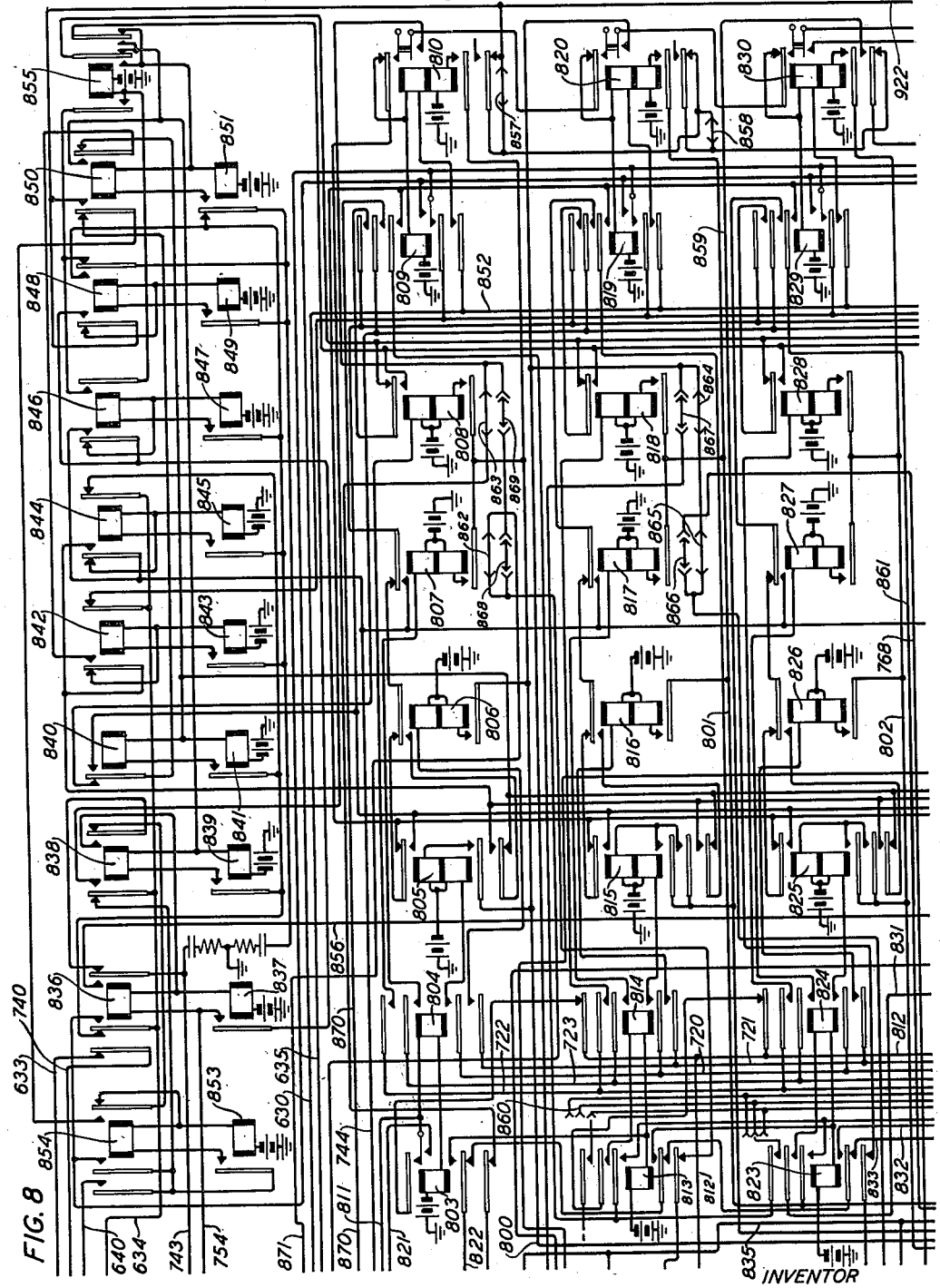
Figure 9:
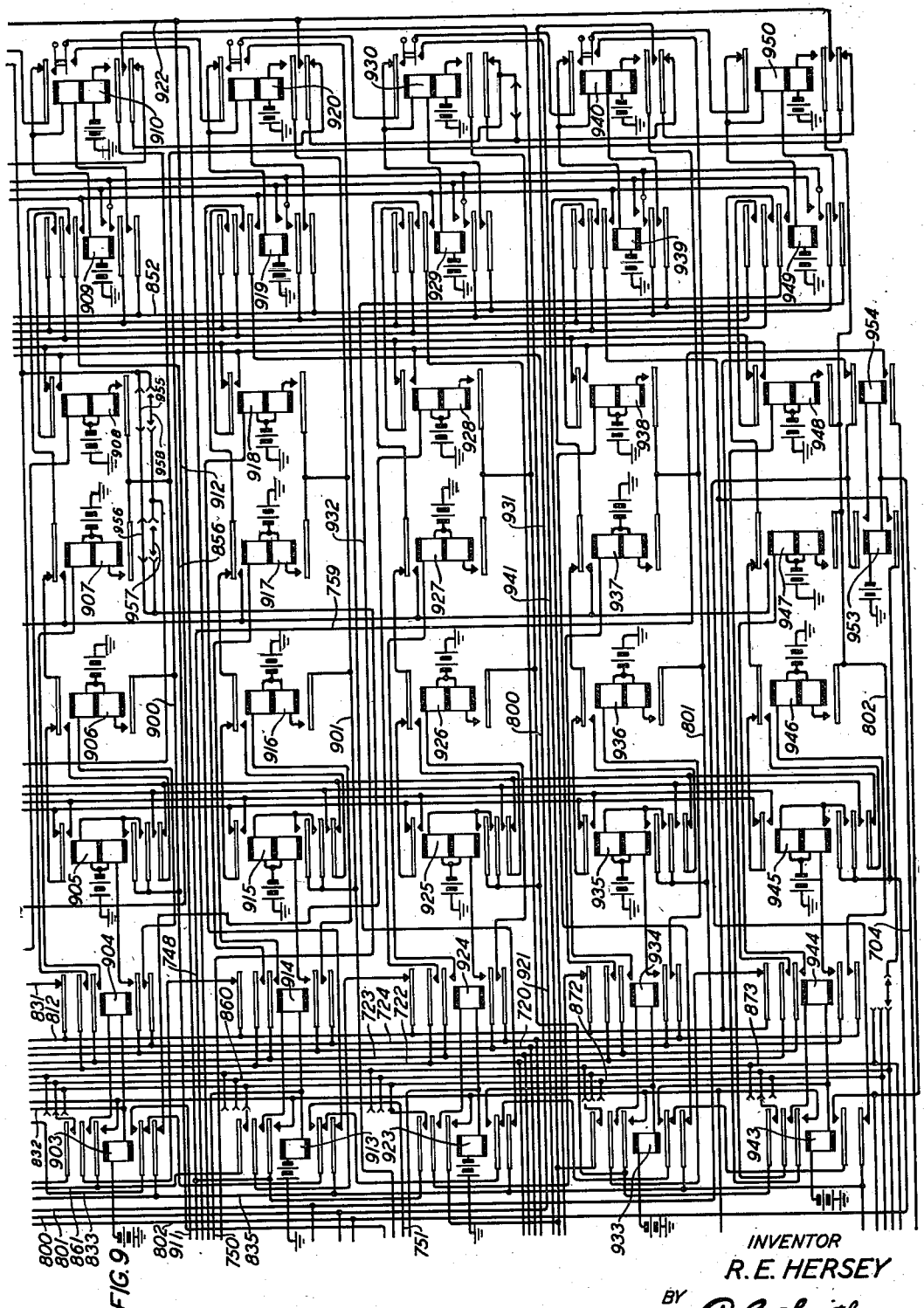
Figure 10:
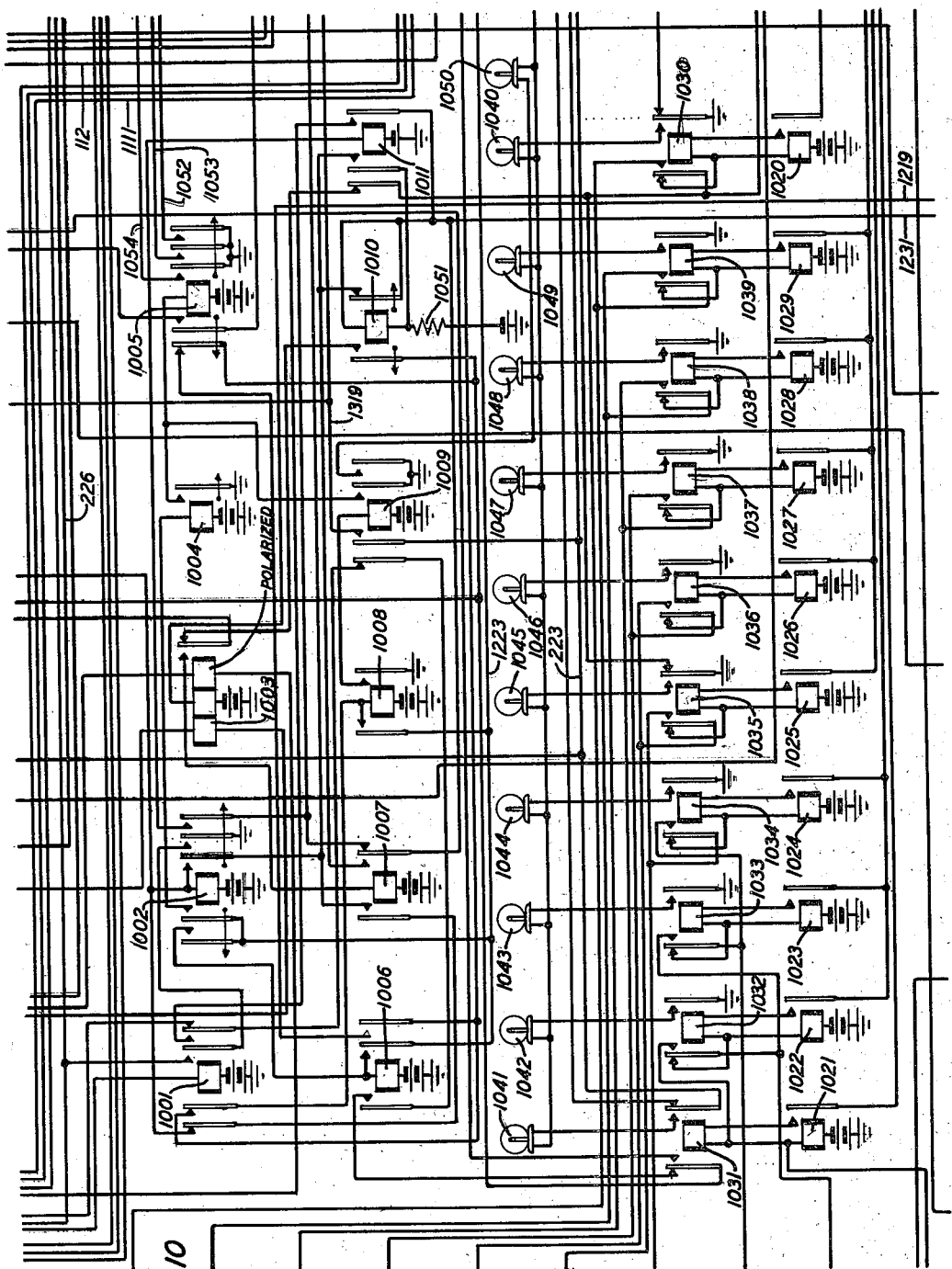
Figure 11:
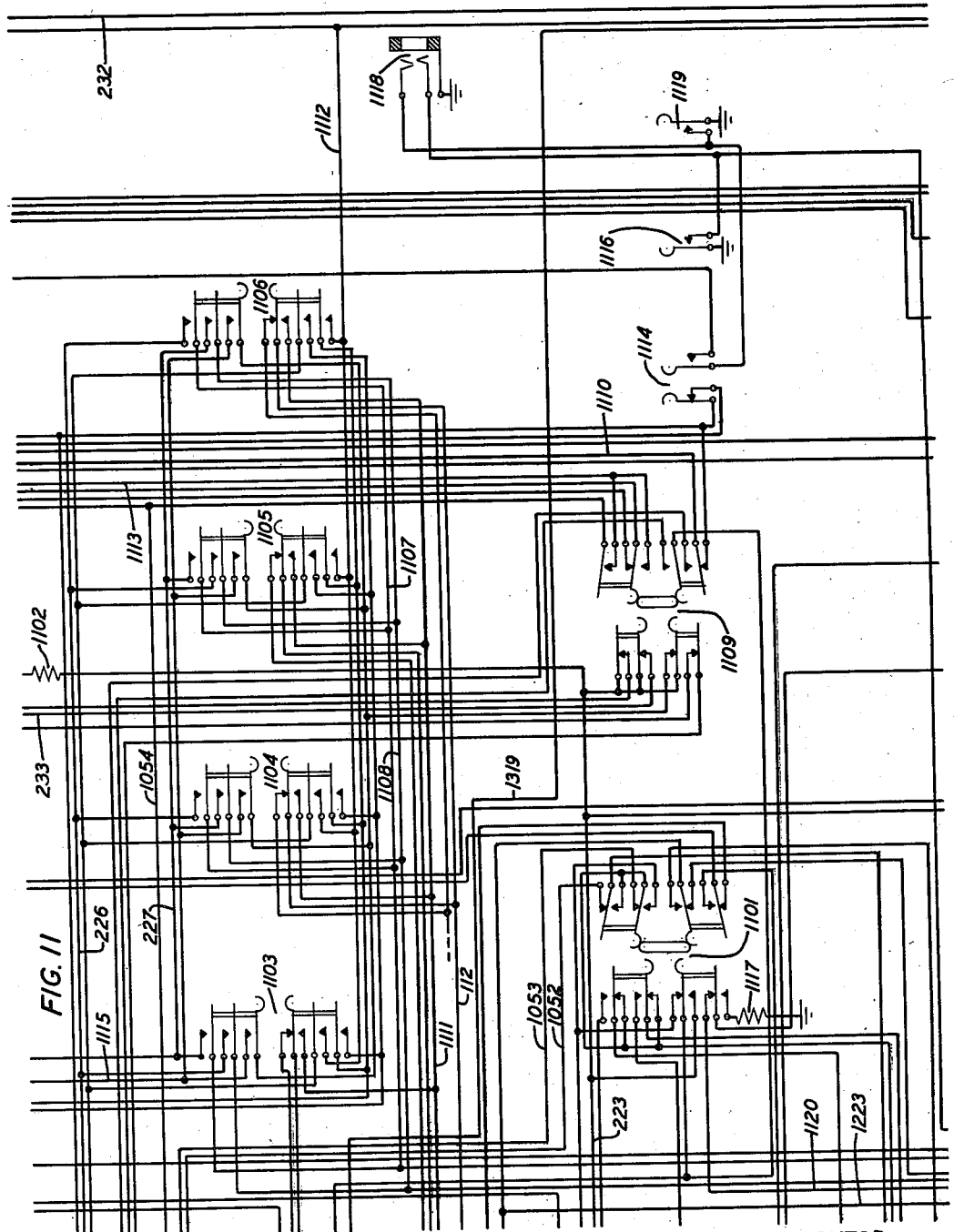
Figure 12:
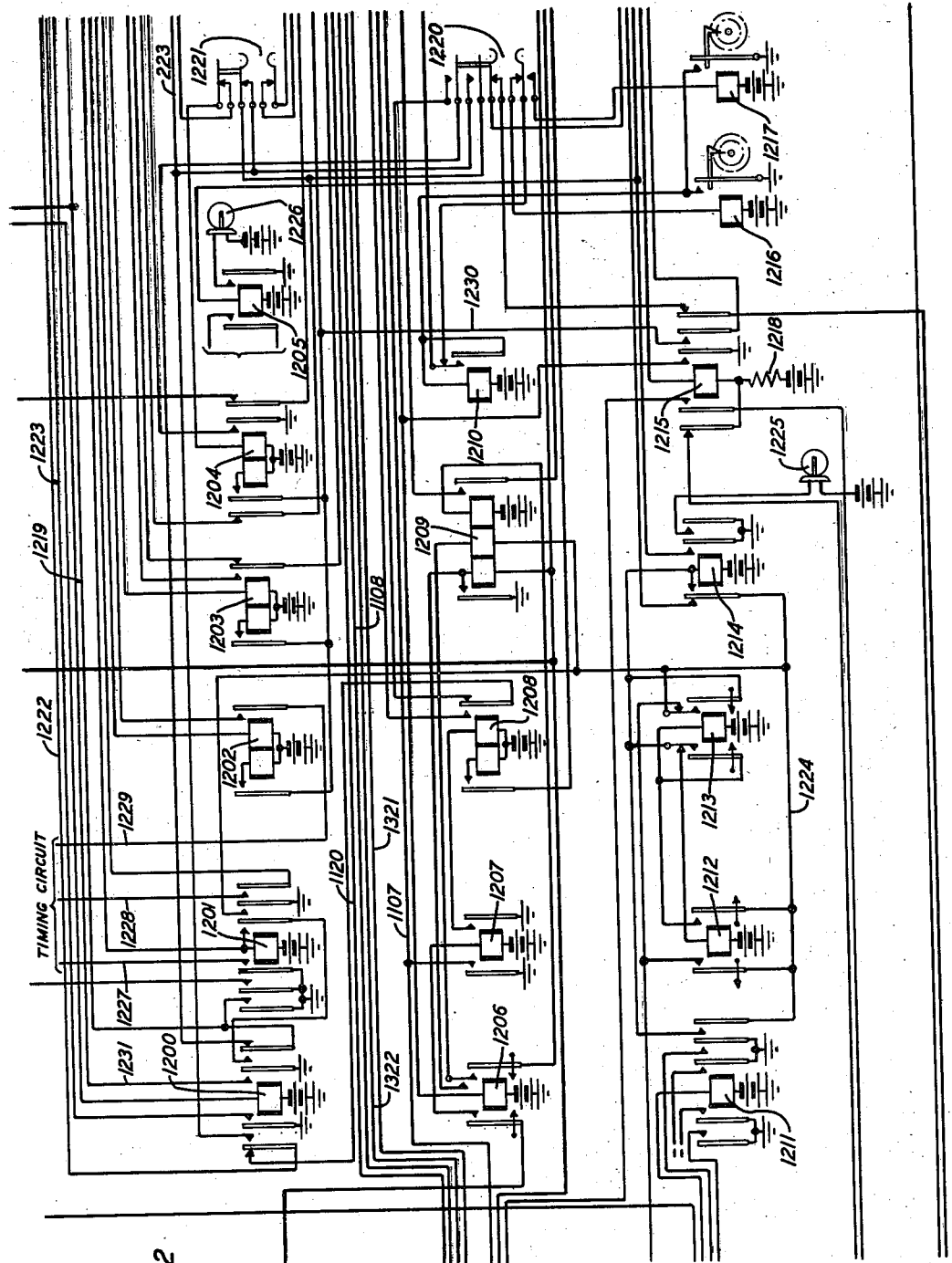
Figure 13:
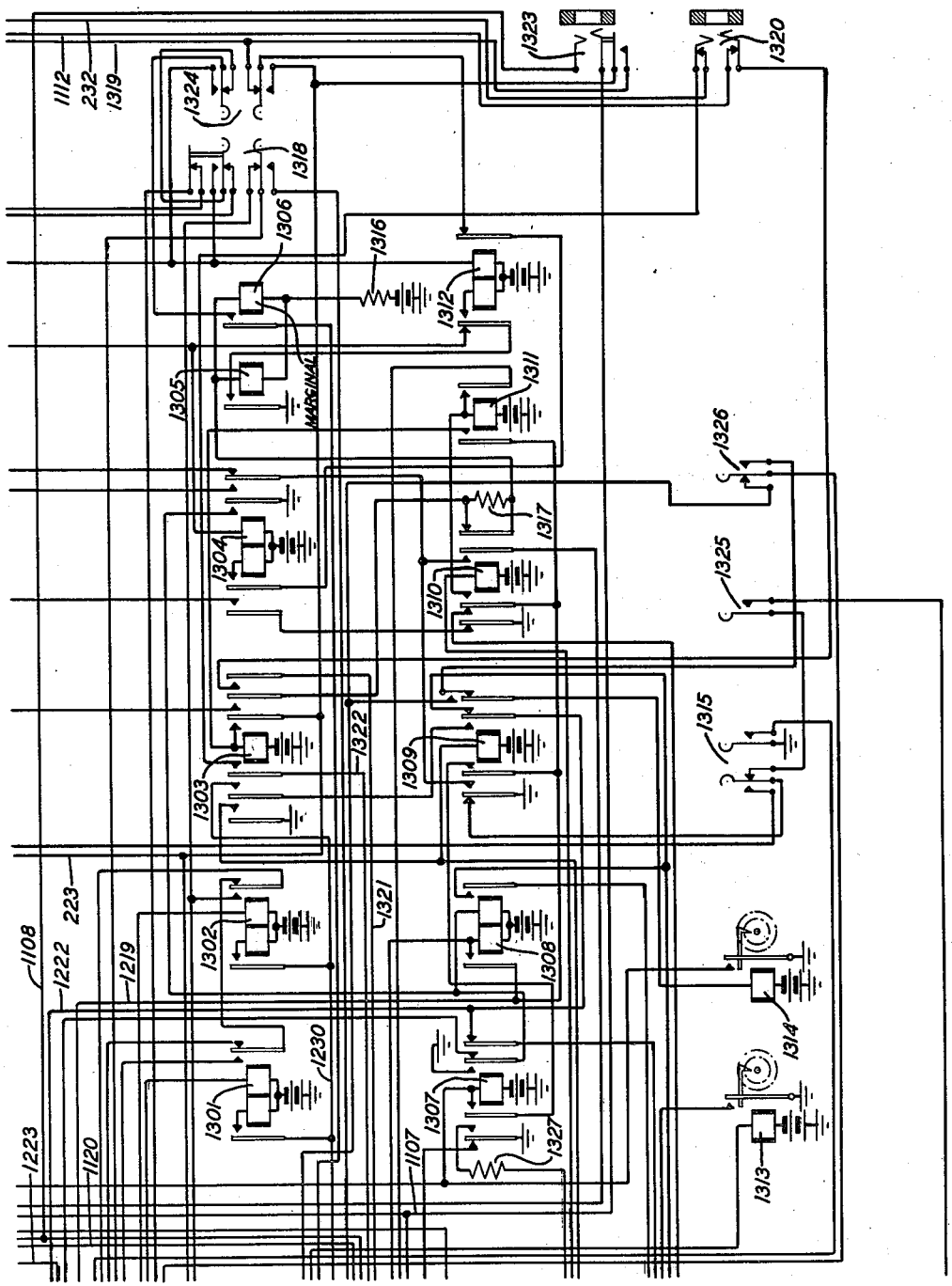

For a clearer understanding of the invention reference is made to the following description which may be read in connection with the attached drawings. The drawings include fourteen figures of which:

Figs. 1 to 5 and 10 to 13, inclusive, disclose the test circuit;

Figs. 6 to 9, inclusive, disclose the sender under test; and

Fig. 14 shows the manner in which Figs. 1 to 13, inclusive, should be arranged.

A sender of the type which the present circuit is adapted to test, is disclosed in Patent 1,916,760, granted July 4, 1933 to I. H. Henry and Figs. 6 to 9 of the present disclosure are copies of the correspondingly numbered figures of that patent. The figures disclosing the present circuit have been so numbered as to permit retaining the original reference numerals for the sender to facilitate reference to the Henry patent.

The sender is arranged to handle as many as four classes of calls which may be fixed or variable, that is, may include only calls requiring the registration and transmission of a fixed number of digits or may include calls requiring the registration and transmission of several different numbers of digits. In addition the sender may, or may not, be required to start ringing the wanted subscriber. A shortened time interval may be required between certain digits and the transmission of certain digits may or may not be delayed until after the registration of a subsequent digit. A comprehensive system of strapping permits arranging these functions to agree with the conditions at the office at which such a sender is used.

In the Henry patent the straps are arranged to provide the following four classes:

Class A—Fixed class of four digits—ringing may be required—shortened time interval before fourth digit—no digit delayed.

Class B—Variable class, maximum of eight digits—ringing never required—shortened time interval only before eighth digit—first and second digits delayed.

Class C—Fixed class of five digits—ringing never required—shortened time interval before the fifth digit—no digit delayed.

Class D—Variable class, maximum of eight digits—ringing may be required—shortened time interval only before eighth digit—first and second digits delayed.

In order that the test circuit may likewise be arranged to correspond to the senders to be tested, it is provided with four class keys 1103 to 1106. The keys correspond to classes C, D, A and B, respectively. The two outer upper and two outer lower contacts of these keys determine the connection of battery and ground to the key pulsing conductors and the fundamental circuit in simulation of the action of the trunk circuit. The inner upper contact tells the test circuit whether or not it must test for delayed transmission of certain digits, while the inner lower contact marks the last digit which may be transmitted or received for the particular class. Special keys 316 and 315 are used for controlling the application of immediate ringing when it is desired to test this function.

In addition, the test circuit is equipped with a keyset including a strip of keys and a pair of transfer relays for each possible digit, a set of pulsing relays for transmitting designations to the sender under the control of the keyset and a set of counting relays for counting the pulses transmitted by the sender in combination with the keyset to determine whether the number of pulses received is correct. Furthermore, lamps are provided for each counting relay, for each digit and for each stage of the operation of the test circuit so that in case of failure the point of failure may be identified.

A number of special test keys are provided including keys 315 and 316 for testing the ringing function, key 301 which tests for the response of the sender to a premature disconnection, key 1101 which is employed in testing the speed of the sender impulses, key 1109 which adapts the test circuit to transmit the complete designation before permitting the sender to transmit any digits, the key 1324 which prepares the test circuit to receive a reorder signal from the sender and key 1318 which causes the sender to transmit a reorder signal after its time alarm circuit has functioned.

*Test of registration*

Assuming that the first test to be made is the registration test, that it is to be made on all senders, and that the first sender selector 500 is standing in the first operative position, class key 1106 will be operated since it is desirable to make registration on all registers which is possible under the assumed conditions only with a variable class and since it is not desired to test immediate ringing. Registration test key 1109 will be operated together with one digit key in each row of the keyset. The test call may conveniently be Chelsea 3-1579M and keys 402, 414, 423 and 476 will be operated as well as the first key in the fourth row, the fifth key in the fifth row, the seventh key in the sixth row and the ninth key in the seventh row which have not been shown. Last of all the start key 1315 is operated. The operation of key 1315 in turn operates relay 1201 and connects ground from the left back contact of relay 1309 over the left operated contact of key 1315 to the sender busy lamp 327. The key 312, which controls the circuits of the lamps of Fig. 3, may be operated prior to the operation of the start key to permit the lighting of the lamps as the operation of the test circuit progresses or may be left unoperated leaving the lamps dark until a trouble is encountered, as desired.

With relay 1201 operated, ground is connected over conductor 1227 to the timing circuit to start its operation. A circuit is also closed from battery through resistance 1218, winding of relay 1215, inner right back contact of relay 1309, outer right back contact of relay 1307, back contact of relay 1214, conductor 1224, to ground at the middle right contact of relay 1201. Relay 1215 at its inner right contact completes the circuit of relay 1206 and at its left front contact, provides locking ground for relay 509 independent of relay 510. Relay 1215 also connects ground from the outer left contact of relay 1201, conductor 1219, inner left back contact of relay 1310, outer right front contact of relay 1215 to conductor 1230, providing locking circuits for the timing relays 1202 to 1204, 1301 and 1302. The connection of ground to conductor 1219 by relay 1201 also closes a circuit from battery through the middle winding of relay 1003, for electrically polarizing relay 1003. The connection of ground to conductor 1224 by relay 1201 also closes a circuit over the right normal contact of relay 1213, lower normal contact of key 561, over the corresponding contacts of the keys of intermediate sender selectors, lower normal contact of key 511, inner left back contact of relay 510 to the windings of relays 508 and 509 in parallel. The operation of relays 508 and 509 connects brushes 501 to 506 of the first sender selector 500 through to the testing equipment.

Assuming that selector 500 is resting on terminals leading to an idle sender which is characterized by battery through a resistance connected to conductor 519, a circuit will be closed from battery through resistance 602, inner left back contact of relay 601, inner right back contact of relay 602, conductor 519, brush 506, outer right contact of relay 509, left winding of relay 1209, right contacts of relay 1206, middle winding of relay 1209 to grounded conductor 1224. A circuit also extends from battery through the right winding of relay 1209 over the right contacts of relay 1206 and through the middle winding of relay 1209 to grounded conductor 1224. Relay 1209 will operate in this circuit and lock through its left winding alone directly to ground. If the test circuit and a link circuit should test a sender at the same time, the circuit in which the locking circuit of the test relay closes first, will hold the sender busy and lock out the other circuit. Assuming that the sender is idle, the operation of relay 1209 closes a circuit from battery through the winding of relay 1310, right front contact of relay 1209 to ground at the left back contact of relay 1307. Relay 1310 at its left front contact connects relay 1311 to grounded conductor 1219. Relay 1311 locks in a circuit from battery through its winding and right contact, back contact of relay 1208, left back contact of relay 1200, conductor 1222, outer right back contact of relay 1307, left back contact of relay 1214 to grounded conductor 1224. Relay 1311 closes a circuit from battery, through the winding of relay 1303, left front contact of relay 1311 to grounded conductor 1219.

Relay 1303 closes an obvious circuit for relay 1309, and extends the fundamental tip conductor 531 and fundamental ring conductor 533 to the class key 1106. It also closes a circuit from battery through resistance 1316 through the windings of sensitive relay 1305 and marginal relay 1306 in parallel, through resistance 1317, the shunt around this resistance being opened by the operation of relay 1310, middle right contact of relay 1303, outer lower left normal contact of key 1101, conductor 1120, outer right contact of relay 508, brush 505, conductor 527, left and middle windings of relay 603 and in shunt of the right winding of relay 603 to ground over the upper normal contact of relay 604 and the upper back contact of relay 605.

The operation of relay 1309 opens the circuit of relay 1215 which now releases. Relay 1309 also connects ground from conductor 1222 over the inner right front contact of relay 1309 and the middle left contact of relay 1303 to conductor 1230 to provide a new locking circuit for the timing relays 1202, 1203, 1204, 1301 and 1302. It also disconnects ground from the sender busy lamp 327 and connects ground over the back contact of relay 1304 to the sender control lamp 325 and over the right front contact of relay 1310 to the off-normal lamp 326. Relay 1215 in releasing opens the circuit of relay 1206 which also releases and opens the locking circuit of relay 509. However, relay 509 is held operated over its operating winding.

The circuit above traced through relays 1305 and 1306 and the sender relay 603 tests the ability of relay 603 to operate in series with a given maximum resistance. Assuming that relay 603 operates, an obvious circuit is closed for relay 606 which in turn closes an obvious circuit for relay 600. Relay 600 disconnects battery through resistance 602 from conductor 519 to mark the sender busy to link circuits, connects ground to conductor 607 extending to the sender time alarm circuit and connects the right winding of the sender time alarm relay 700 to conductor 608. Relay 606 also closes an operating circuit from ground at its inner lower front contact, over conductor 610, to battery through the winding of relay 701 which operates closing ground to conductors 800, 801, 802, 900 and 901 for furnishing locking ground to the sender register relays and closing a circuit over conductor 702 to battery through the winding of relay 611. In addition, relay 606 closes an operating circuit for transfer relays 803 and 804 in series over conductor 811, outer right back contact of relay 703, conductor 704 to ground at the inner upper front contact of relay 606. Relay 803 closes a locking circuit for itself and relay 804 over its upper front contact, upper back contact of relay 814, conductor 812, upper back contact of relay 612 to ground on conductor 704 and extends its locking ground over conductor 821, right normal contact and winding of relay 703 to battery. Relay 703 operates and locks over its right alternate contacts to ground on conductor 704 and opens the initial operating circuit of relays 803 and 804. Relay 804 upon operating connects the operating windings of relays 805 to 808, inclusive, of the first sender register to the contacts of the key pulsing relays 705, 706, 715 and 716, in readiness to register the first digit transmitted by the test circuit.

If relay 603 fails to operate, battery through resistance 602 remains attached to conductor 519 and relay 1209 remains operated to prevent the advance of the test and permit the timing relays of the test circuit to operate and sound an alarm.

If relay 603 operates as it should, relay 1209 releases in turn releasing relay 1310. Relay 1310 closes a shunt around resistance 1317 thereby permitting relay 1305 to operate in series with relay 603. Relay 1306 being marginal does not receive sufficient current at this time and remains unoperated. The operation of relay 1305 closes a circuit for relay 1304 over the back contact of relay 1312. Relay 1304 operates relay 1308 and closes a circuit over the inner right back contact of relay 1307 for relay 1200. Relay 1304 locks in a circuit from battery through its left winding and inner left contact, right back contact of relay 1312, lower normal contact of key 1324, conductor 1319, right back contact of relay 204, inner left back contact of relay 210, conductor 223, outer left front contact of relay 1200 to grounded conductor 1222. A temporary locking circuit extends to conductor 223 as above traced and thence over the inner right contact of relay 1303 and the left contact of relay 1311 to grounded conductor 1219, which circuit is effective if relay 1305 operates prior to the shunting of the resistance 1317. Relay 1304 also disconnects ground from lamp 325. Relay 1308 locks over its left front contact to grounded conductor 1219 and thus remains operated until the start key 1315 is restored.

Relay 1200 connects ground directly to conductors 1223 and 1231 and extends ground from conductor 1222, to conductor 223. The connection of ground to conductor 1231 completes a circuit to battery through resistance 1051 and the winding of relay 1010. Relay 1200 also closes a locking circuit for relay 1201 which extends over the inner right contact of relay 1201, outer right contact of relay 1200 and the outer left contact of relay 1201. The connection of ground to conductor 223 serves to hold relay 1303 operated and provides a locking circuit for other relays. Relay 1200 also disconnects ground from the locking circuit of relay 1311.

Assuming that the key 1220 is normal so that a complete test of the senders of the office is to be made, the operation of relay 1200 also closes a circuit from battery through the winding of complete test meter 1216, lower normal contact of key 1220, normal contact of relay 1210, inner lower right normal contact of key 1101 to ground on conductor 1223. Meter 1216 in operating, closes an obvious circuit for relay 1210 which locks over the operating circuit for meter 1216 independent of the repeat key 1220. Ground connected to conductor 223 also completes a circuit over the left back contact of relay 206, outer left back contact of relay 302, windings of relays 105 and 104 in series to battery. Relay 104 closes the locking circuit for the two relays over its outer left front contact, left back contact of relay 102, left back contact of relay 107 to grounded conductor 223. It also connects ground over its inner left contact to battery through the inner normal contact and winding of relay 302. Relay 302 opens the operating circuit of relays 104 and 105 and locks over its front contact and the back contact of relay 206 to grounded conductor 223. Conductor 223 is also extended through resistance 1102 to the right winding of relay 305 thereby operating relays 303, 304 and 305 and preparing them to act as a relay interrupter.

When relay 1310 releases with relay 1304 operated as above described, it extinguishes lamp 326 and closes a circuit from battery through resistance 224, winding of relay 218, left front contact of relay 1304, outer left back contact of relay 1310 to ground. Relay 218 closes an additional locking circuit for relay 1304 which extends as previously traced to conductor 1319 and over the inner lower normal contact of key 301 and the outer right contact of relay 218 to grounded conductor 223. Relay 218 also connects ground over its inner left contact to the winding of relay 212, normal contact of relay 212, outer left contact of relay 218, conductor 226 to contacts of class keys 1103, 1104, 1105 and 1106 and also connects 24-volt battery through resistance 225 over the outer left back contact of relay 213, inner right front contact of relay 218, conductor 227 to other contacts of class keys 1103 to 1106. These circuits are completed to either conductor 537 or 529, dependent upon which class key is operated, as an operate test of relay 613 or relay 614 in the sender circuit. Since key 1106 is operated, ground on conductor 226 will be extended over the outer upper contact of key 1106, conductor 1107, left front contact of relay 509, brush 503, conductor 529, upper back contact of relay 613, lower back contact of relay 614, winding of relay 614 to ground at the middle upper contact of relay 606, while battery on conductor 227 will be extended over the middle upper contact of key 1106, conductor 1108, inner right contact of relay 508, brush 504, conductor 537, inner upper back contact of relay 614, lower back contact of relay 613, through the winding of relay 613 to ground at the outer upper contact of relay 606. Relay 613, therefore operates and relay 614 does not. Relay 613 locks in a circuit from ground at the outer upper contact of relay 606, winding of relay 613, outer lower front contact of relay 613 to battery through resistance 621. Relay 613 operated extends conductor 537 over the inner upper back contact of relay 614, inner lower front contact of relay 613, outer upper back contact of relay 612, conductor 623, through the windings of relays 715, 716 and 724 in series to 24-volt battery, and extends conductor 529 over the inner upper front contact of relay 613, lower back contact of relay 612, conductor 622, through the windings of relays 705, 706 and 714 to 24-volt battery. The sender is now ready to receive a designation from the test circuit.

When conductor 529 is transferred from ground through relay 614 to battery through the windings of relays 705, 706, and 714, relay 212 operates locking in a circuit from ground at the inner left contact of relay 218, through the winding and left front contact of relay 212 to battery through resistance 228. Relay 212 closes an obvious circuit for relay 213 which extends conductor 223 over its outer right contact to the winding of relay 214 and battery, relay 214 locking to conductor 223 independent of relay 213. Relay 213 also lights the key pulsing lamp 324. Relay 214 closes a circuit from grounded conductor 223, inner upper contact of key 1221, left back contact of relay 1204, outer upper normal contact of key 1318, right front contact of relay 214, left back contact of relay 205, outer lower right operated contact of key 1109, conductor 1119 to the armature of relay 303. Since relay 303 is operated, this ground extends over the front contact of relay 303 to resistance 313 and battery in shunt of the windings of relays 303, 304 and 305. Relays 303, 304 and 305 constitute the key pulsing interrupter and when relay 1200 connects ground to conductor 223 relays 303, 304 and 305 operate in series between this ground and battery through resistance 313. At the same time a circuit extends from ground through condenser 314, through the left winding of relay 305, right winding of relay 304 and left winding of relay 303 to battery through resistance 313 in which condenser 314 is charged. When now relay 214 connects ground to the armature of relay 303, ground is connected to both sides of the operative windings of relays 303, 304 and 305 and these relays start to release. However, this ground also causes the discharge of condenser 314 and the discharge current is in a direction to retard the release of the relays. When relay 303 opens its contact, the circuit from battery through the relays to conductor 223 again becomes effective and the relays start to reoperate. In this case condenser 314 also starts to charge and the charging current is such as to oppose the operation of the relays. The action of the condenser 314 is therefore to delay both the release and reoperation of the interrupter relays. The capacity of the condenser and the size of the resistances 313 and 317 are adjusted so that the relays operate and release at approximately .050 second intervals.

The first release of relay 303 connects conductor 1110 which is grounded over the circuit above traced, over the back contact of relay 303, outer left back contact of relay 219, left back contact of relay 307, inner left back contact of relay 308 through the winding of relay 306 to battery. Relay 306 prepares a locking circuit for itself through its winding and the winding of relay 307, front contact of relay 306, outer left back contact of relay 308, right back contact of relay 222 to grounded conductor 223. When relay 303 again operates, relay 307 operates in this locking circuit, extending the pulsing conductors from the contact of relay 304, over the inner right contact of relay 307 to the middle right armature of relay 105 and over the front contact of that armature to the outer right contacts of the first row of keys, and from the contact of relay 305, over the outer right contact of relay 307 to the inner right armature and front contact of relay 105 and thence to the inner right contacts of the first row of keys. At this time the contacts of relays 304 and 305 are opened so that no pulse is transmitted. The function of relays 306 and 307 is to absorb the first pulse which may not be of standard duration.

When now relays 303, 304 and 305 again release, 48-volt battery through high resistance 481 is connected over the right contact of key 402 to the inner right armature of relay 105 and thence as previously traced by way of the contact of relay 305 and class key 1106 to conductor 529 and the windings of relays 705, 706 and 714. The current flow in this circuit operates sensitive relay 714 and is in the correct direction to operate polarized relay 705, but is of insufficient strength to operate marginal relay 706. Relay 714 closes a circuit from ground at its front contact to conductor 822, lower front contact of relay 803 to the winding of relay 813 and battery. Relay 813 locks through the winding of relay 814, middle upper contact of relay 813, back contact of relay 824, to ground on conductor 812, but relay 814 being shunted as long as relay 714 remains operated does not operate at this time. Polarized relay 705 connects ground over its front contact to conductor 721, outer lower front contact of relay 804 and the upper winding of relay 806 to battery. Relay 806 locks through its lower winding to grounded conductor 800.

At the same time, ground is connected from conductor 1110 over the back contact of relay 303 to the left armature of relay 307 as previously described. With relay 307 operated this circuit extends over the left front contact of relay 307, inner upper right operated contact of key 1109, conductor 1113, right front contact of relay 104, inner right back contact of relay 101, winding of relay 106 to battery. Relay 106 closes a locking circuit through the winding of relay 107 over the inner left contact of relay 106, back contact of relay 109 to grounded conductor 223, but relay 107 is shunted as long as relay 303 remains deenergized. At the next operation of relay 303, relay 107 operates in the locking circuit of relay 106 and relay 814 operates in the locking circuit of relay 813, thus preparing the key set and register for the next digit. Relay 107 also opens the locking circuit of relays 104 and 105 so that these relays release, disconnecting the first row of keys from the pulsing conductors. Similarly relay 814 opens the locking circuit of relays 803 and 804, disconnecting the first register from the pulsing conductors. It is to be noted that the pulsing conductors for the second digit extend over the back contacts of relay 101. Relays 101, 102 and 103 are used when it is desired to test the ability of the sender to wait for delayed dialing and the function of these relays will be described hereinafter. Since key 414 is operated, when relays 304 and 305 release, battery through high resistance 481 is connected to conductor 537, resulting in the operation of sensitive relay 724 and polarized relay 715. Relay 724 connects ground to conductor 822 which, with relay 803 released and relay 813 operated, completes the operating circuit for relay 823, which locks through the winding of relay 824 under the control of relay 904. Relay 715 connects ground to conductor 723 and over the inner upper front contact of relay 814 to the upper winding of relay 817 and battery. Relay 817 locks to grounded conductor 801.

In a similar manner transfer relays 108 and 109 and those for the intermediate digits are successively operated and released by the next pair of transfer relays until relays 110 and 111 corresponding to the last digit are operated. Likewise the transfer relays 903 and 904, 913 and 914, 923 and 924, 933 and 934 are operated and released, relays 943 and 944 being operated at the same time that relays 110 and 111 are operated. Relays 110 and 111 lock over the left front contact of relay 110 and the left back contact of relay 105 to grounded conductor 223. The operated keys of the test circuit result in the operation of register relays 806 and 817 as above described and in a similar manner in the operation of relays 825, 826, 905, 918, 926, 928, 937, 938, 945 and 948. When relays 714 and 724 operate during the transmission of the last digit, they both connect ground to conductor 822 which extends over the back contacts of relays 803, 813, 823, 903, 913, 923, 933 and the lower front contact of relay 943 to the winding of relay 953 and battery. Relay 953 locks through the winding of relay 954, front contact of relay 953, conductor 812, inner upper back contact of relay 612 to ground at the inner upper front contact of relay 606. When the last pulse terminates, relay 954 operates in this locking circuit and a circuit is closed from battery through the windings of relays 625 and 612 in series, conductor 649 and conductor 759, front contact of relay 954, to grounded conductor 704, relays 612 and 625 locking over the front contact of relay 625 to grounded conductor 704. When relay 612 operates, the locking circuit of relays 953 and 954 is opened. Since the operation of relay 954 also opens the locking circuit of relays 943 and 944, all of the transfer relays are now released.

When relay 303 closes its back contact during the transmission of the last digit, with relays 110 and 111 operated, a circuit is closed from ground on conductor 1110, back contact of relay 303, left back contact of relay 219, left front contact of relay 307, inner upper operated contact of key 1109, conductor 1113, back contacts of relays 104, 103, 106, 108 and the similar contacts of the relays corresponding to the fourth to seventh digits, inner right front contact of relay 110, conductor 112, inner lower operated contact of key 1106, conductor 1111, right back contact of relay 205, winding of relay 206 to battery. Relay 206 closes a locking circuit for itself through the winding of relay 205, left front contact of relay 206 to grounded conductor 223, but relay 205 does not operate until the termination of the last digit. When this occurs relay 205 transfers the operating circuit of relay 206 over the right front contact of relay 205 to the right back contact of relay 210 and the winding of relay 209 and battery. However, relay 205 also disconnects ground from the contact of relay 303, thus rendering this circuit ineffective at the present time.

When relay 612 operates, it disconnects the winding of the impulse relays 715, 716 and 724 from conductor 537 and extends that conductor over the upper front contact of relay 612, conductor 627, left back contact of relay 725, outer left back contact of relay 726 to 48-volt battery through the left winding of relay 728. It likewise disconnects the windings of impulse relays 705, 706 and 714 from conductor 529 and extends that conductor over the lower front contact of relay 612, conductor 626, right back contact of relay 725, inner left back contact of relay 726 to 48-volt battery through the right winding of relay 727.

In the test circuit, a branch of the pulsing circuit closed over conductor 537, extends in parallel with the contact of interrupter relay 304 over the upper normal contact of keys 315 and 316 to the winding of polarized relay 207 and 24-volt battery, while a branch of the pulsing circuit closed over conductor 529, extends in parallel with the contact of interrupter relay 305 over the lower normal contact of key 315, inner lower normal contact of key 316 to the winding of polarized relay 208 and 24-volt battery. The circuits closed by the test circuit in pulsing to the sender were not in such a direction as to operate the polarized relays 207 and 208, but the 48-volt battery connected to the pulsing leads by the sender at the termination of pulsing does operate these relays and a circuit is closed from ground over the front contact of relay 207, front contact of relay 208, winding of relay 215 to battery. Relay 215 locks over its outer right contact to grounded conductor 223 and connects ground over its inner right contact through resistances 229 and 230 to the winding of relay 208 to hold that relay operated. This ground also shunts the 24-volt battery from the corresponding pulsing conductor and closes a nonoperate test circuit for relay 728 of the sender. This test is maintained until the test of selections has been completed and relay 209 has operated.

The operation of relay 206, as above described, opens the locking circuit for relay 302 while relay 205 in operating closes a circuit from battery through the winding of relay 216, inner left front contact of relay 205 to grounded conductor 223. Relay 216 at its outer right contact lights lamp 323 to indicate that the fundamental circuit is closed. With relay 214 operated and relay 302 released, a circuit is closed from battery through the windings of relays 104 and 105 in series, outer back contact of relay 302, inner left front contact of relay 216 to grounded conductor 223. Relays 105 and 104 lock as previously described and relay 105 opens the locking circuit of relays 110 and 111 thereby releasing them. Relay 216 also connects battery through resistance 231 over the outer left contact of relay 216 to the right winding of relay 1003, left back contact of relay 217, middle lower operated contact of key 1106, back contact of relay 203, conductor 232, tip contact of jack 1320, inner left relay 1303, conductor 1322, inner left contact of relay 508, brush 502, to conductor 531. It also connects ground over its middle right contact, left winding of relay 1003, right back contact of relay 217, lowermost operated contact of key 1106, conductor 1112, ring contact of jack 1320, outer right contact of relay 1303, conductor 1321, outer left contact of relay 508, brush 501, to conductor 538.

In the sender the operation of relay 611 established a circuit for operating impulse generating relays 730 and 731 extending from ground at its inner upper front contact, conductors 628, 629 and 630, resistances 732 and 733, resistance 735 to battery and in parallel over the lower contacts of jack 734, left windings of polarized relays 730 and 731, upper contacts of jack 734, resistance 736 to battery, in preparation for pulsing to selectors. Relays 730 and 731 both operate. With relay 730 operated a circuit for relay 1003 may be traced from conductor 531, lower back contact of relay 617, inner lower front contact of relay 611, outer lower contact of relay 604, through the windings of relays 618 and 619 in series, conductor 620, over the back contact of relay 711 or the front contact of relay 730 in parallel, conductor 712, upper back contact of relay 617 to conductor 538. Relay 1003 operates in this circuit.

Relay 1003 in operating closes a circuit from battery through the winding of relay 1007, front contact of relay 1003, inner left back contact of relay 219, outer left back contact of relay 210 to grounded conductor 223. Relay 1007 closes a circuit from battery through the winding of relay 1002, outer left contact of relay 1001, left front contact of relay 1007, inner lower left normal contact of key 1101, back contact of relay 1031 to grounded conductor 223. Relay 1002 locks over its inner right contact to its operating circuit independent of the contacts of relays 1001 and 1007. Relay 1002 closes a circuit from battery through the winding of relay 1004, inner left contact of relay 1002 to grounded conductor 1223. Relay 1004 in turn operates relay 1005 which connects ground over its right contacts to conductors 1052, 1053 and 1054 for purposes which will appear hereinafter. Relay 1002 also connects ground from conductor 1223 over its outer left contact to the winding of relay 1006, which locks to conductor 1223 independent of relay 1002. Relay 1006 prepares the counting relay circuit for the first digit, which may be traced from ground to the armature of relay 1003 as above, and over the back contact of relay 1003, left front contact of relay 1010, left back contact of the counting relay 1031, left contact of relay 1006, back contact of relay 1009, right back contact of relay 1001, outer right front contact of relay 105, left normal contact of key 404, left operated contact of key 402, back contact of relay 1032 to the winding of relay 1022 and battery. This circuit remains open until relay 1003 is released by the action of the sender.

In the sender the closure of the fundamental circuit through the windings of relay 1003 and the windings of relays 619 and 618, produced current flow which was in such a direction as to operate relay 618. Relay 618 connects ground from conductor 704 over its front contact, lower back contact of relay 616 to the winding of relay 615 and battery. With relay 613 operated the operation of relay 615 completes a circuit from ground over the outer upper back contact of relay 614, outer upper front contact of relay 613, middle upper front contact of relay 615, conductor 719 through the winding of class relay 710 to battery. Relay 710 in turn closes a circuit from ground at its outer right contact through the winding of relay 737 and battery. The sender has now received the complete class designation and is ready to control selections.

With relay 737 operated, the circuit for controlling the transmission of the first set of selective pulses is closed, the circuit extending from battery through the winding of relay 809, upper back contact of transfer relay 810, lower back contact of relay 803, straps 651, 652, conductor 681, outer right front contact of relay 737, conductor 767, straps 655 and 656, conductor 871, strap 862, lower back contact of transfer relay 813, straps 657 and 658, conductor 835, inner left front contact of relay 703, conductor 740, outer left back contact of relay 836, conductor 633 to ground at the inner lower front contact of relay 615. Relay 809 upon operating locks through the upper winding of relay 810, lower front contact of relay 809, conductor 852, right back contact of counting relay 842, conductor 634 to ground at the middle lower front contact of relay 606. Relay 810 being shunted does not operate at this time. Relay 809 also closes a circuit from ground on conductor 630, inner lower front contact of relay 809, conductor 635, upper back contact of relay 636, back contact of relay 637, upper back contact of relay 638, inner lower back contact of relay 604, conductor 639, front contact of relay 731, upper contact of jack 734, left windings of relays 731 and 730, lower contact of jack 734 to battery through resistance 735 and in parallel with the left windings of relays 731, 730 to battery through resistance 736. Relays 730 and 731 function in the manner set forh in the above identified Henry patent which is similar to the operation of the key pulsing interrupter and the connection of ground to the armature of relay 731 causes relays 730 and 731 to release, the action being delayed by the discharge of condenser 742.

Upon the first release of relay 731, a circuit is established from ground on conductor 639, back contact of relay 731, conductor 743, right back contact of counting relay 836, right back contact of counting relay 838, back contact of counting relay 854 to battery through the winding of counting relay 853. Relay 853 upon operating locks through the winding of relay 854, front contact of relay 853, left back contact of relay 838 to ground on conductor 634, but relay 854 being shunted does not operate until relay 731 has reoperated. Relay 854 upon operating extends ground from conductor 634 over the left back contact of relay 838, inner left contact of relay 854 to the armatures of the Nos. 6 and 7 counting relays 849 and 851, affording locking ground for these relays; over the back contact of relay 851 to the armatures of the Nos. 3 to 5 counting relays 843, 845 and 847 for locking these relays when operated, and at its outer left contact connects ground from conductor 634 over conductor 640 to battery through the winding of the pulse help relay 711. Relay 711 upon operating closes a shunt around the windings of relays 618 and 619 extending from conductor 620, right front contact of relay 711 to conductor 641, thus removing these relays from the fundamental circuit and at its left contact opens one point in the fundamental circuit, thus placing the fundamental circuit under the control of relay 730. The next release of relay 730 opens the fundamental circuit permitting the release of relay 1003. With register relay 806 operated, the simultaneous release of relay 731 connects ground from its back contact, conductor 743, right back contact of relay 836, right back contact of counting relay 838, right front contact of relay 854, left back contact of relay 850, back contact of relay 840, middle upper contact of transfer relay 809, back contact of relay 807, front contact of relay 806, lower back contact of relay 805, winding of relay 841 to battery. Relay 841 locks in the usual manner through the winding of relay 840 over the innert left back contact of relay 836, to ground on conductor 634. When relay 731 reoperates relay 840 operates in this locking circuit. At the next release of relay 731, the counting relay circuit extends as above traced to the armature of relay 840, and over the front contact of that relay, outer upper contact of relay 809, back contact of relay 808, inner back contact of relay 855 to the winding of relay 839 and battery. Relay 839 locks through the winding of relay 838 over the left back contact of relay 836 to ground over conductor 634. Relay 838 operates when relay 731 reoperates, and opens the locking circuit of relays 853 and 854 which now release in turn releasing relay 711. When relay 711 releases the windings of relays 618 and 619 are again connected into the fundamental circuit. The further operation of relays 730 and 731 is ineffective to transmit impulses to the fundamental circuit since the contact of relay 730 is now shunted by the left normal contact of relay 711.

However, the impulses developed by relay 731 are still effective and upon the next release of relay 731 a circuit is established which may be traced to conductor 743 and then over the right back contact of relay 836, right front contact of relay 838 to battery through the winding of relay 837. Relay 837 operates and locks through the winding of relay 836, front contact of relay 837, inner lower front contact of relay 809 to ground on conductor 639. Relay 836 operates in this locking circuit upon the next energization of relay 731 opening at its outer left back contact the shunt around transfer relay 810 which operates in the locking circuit of transfer relay 809. The operation of relays 836 and 837 begins the timing interval which normally serves to permit the selector switch to hunt for an idle trunk in the level of its bank to which its brushes have been moved.

In the test circuit the release of relay 1003 due to the first impulse transmitted by the sender completes the counting relay circuit above traced. Relay 1022 locks in series with relay 1032, contact of relay 1022, inner upper right normal contact of key 1101, conductor 1053, to ground at the middle right contact of relay 1005, relay 1032 operating when relay 1003 reoperates. The second release of relay 1003 again completes the counting relay circuit which extends over the front contact of relay 1032 to the winding of relay 1021 and battery. Relay 1021 locks through the winding of relay 1031 to ground over the inner upper left normal contact and the inner upper right normal contact of key 1101 to grounded conductor 1053.

Relay 1007 also follows the pulsing and at the first closure of its back contact closes a circuit from grounded conductor 1231, back contact of relay 1007, outer right contact of relay 1002, to the winding of relay 1011 and battery. Relay 1011 locks over the right contact of relay 1002 and its own right contact to grounded conductor 1231 independent of relay 1007. With relay 1011 operated, the closure of the front contact of relay 1007 connects ground from conductor 1231 over the front contact of relay 1007, left front contact of relay 1011, to battery through resistance 1051, tending to shunt down relay 1010. However, relay 1010 is slow-to-release and the time during which the ground is connected in shunt of its winding during pulsing is insufficient to release it, but, should the sender send too few pulses to operate relays 1021 and 1031, the closure of this circuit by relay 1007, when held operated between digits, would permit relay 1010 to release, opening the counting relay circuit and preventing the completion of the test. If the sender sends out too many impulses, the operation of relay 1031 will extend the counting relay circuit over the left front contact of relay 1031, left back contact of relay 222, outer lower right normal contact of key 1101, inner left contact of relay 1001 to the winding of relay 1008 and battery. Relay 1008 locks to grounded conductor 1223 and in turn operates relay 1009 which supplies ground to lamp 1050 and holds relay 1005 operated, likewise preventing the advance of the test.

If the pulses from the sender are correct in number the operation of relay 1031 will open the locking circuit of relay 1002 which releases, in turn releasing relays 1011 and 1004. The release of relay 1004 in turn releases relay 1005 which opens the locking circuit of the counting relays, releasing them, and prepares a circuit from battery through the winding of relay 1008, inner left contact of relay 1001, outer right contact of relay 1006, left back contact of relay 1005, left front contact of relay 1010, to the back contact of relay 1003 so that if a pulse is received before the circuits are prepared for its reception relay 1003 will be operated, blocking the test with lamps 1050 and 323 lighted.

Relay 1005 when it operated closed a circuit from ground at its inner right contact over conductor 1054, the outer upper right operated contact of key 1109, conductor 1113, right front contact of relay 104, inner right back contact of relay 101 to the winding of relay 106 which locks through the winding of relay 107 and the left back contact of relay 109 to grounded conductor 223, relay 107 remaining unoperated until the release of relay 1005 at the termination of the first digit permits relay 107 to operate, releasing relays 104 and 105 and preparing an operating circuit for relay 108. Relay 107 also prepares the counting relay circuit for checking the second digit over the second operated numerical key.

When relay 1031 releases, relays 1003, 1004 and 1005 are reoperated further preparing for the reception of the second digit. The cycle of operations above described occurs in the testing circuit for each digit, the transfer relays being successively reoperated to control the checking circuits of the corresponding digits.

In the sender, following the operation of relay 836, the pulsing circuit controlled by relay 731 is extended over the right front contact of relay 836, conductor 856, lower back contacts of transfer relays 950, 940, 930, 920, 910, 830, 820, strap 857, conductor 922, left back contact of counting relay 848 to battery through the winding of counting relay 849. Counting relays 849, 848, 847, 846, 845, 844, 843 and 842 are operated under the control of relay 731 to measure a time interval. Relay 842 when operated opens the locking circuit of transfer relay 809 which releases, relay 810 being held energized over its lower winding and inner lower front contact to ground on conductor 809. Relay 809 on releasing opens the locking circuit of relays 836 and 837 which now release opening the locking circuit of relays 842 to 849, inclusive, which also release. Relay 809 also disconnects the contacts of register relays 805 to 808, inclusive, from the counting relays thereby rendering these register relays ineffective. With relay 810 operated and relay 813 released, transfer relay 819 is operated and locked through the upper winding of relay 820. The next closure of the back contact of relay 731 operates relay 853 which locks as above through the winding of relay 854 which operates on the energization of relay 731 to in turn operate relay 711 shunting the windings of relays 618 and 619 and removing the shunt from the impulsing contact. The operation of relay 711 terminates the time interval between the first and second digits. The remaining digits are transmitted by the sender in a similar manner. Since class relay 710 is operated, when transfer relay 940 operates following the transmission of the seventh digit, the circuit for starting the timing interval extends as above traced to the back contact of relay 950, outer lower front contact of relay 940, conductor 941, outer left back contact of relay 708, outer left front contact of relay 710, conductor 744, left back contact of relay 844, through the winding of relay 845 to battery. Therefore, the interval between the seventh and eighth digits is 0.4 second instead of the 0.6 second interval used between other digits.

When relay 1005 operates for the last digit, it connects ground over conductor 1054, outer upper right operated contact of key 1109, conductor 1113, back contact of relay 104, inner right back contact of relay 103, inner right back contacts of relays 106, 108 and the corresponding relays belonging to intermediate sets of keys as indicated by the dotted line, over the right front contact of relay 110, conductor 112, inner lower operated contact of key 1106, conductor 1111, right front contact of relay 205, right back contact of relay 210 through the winding of relay 209 to battery. Relay 209 operates, locking through the winding of relay 210 and the inner right front contact of relay 209 to grounded conductor 223 but relay 210 does not operate until relay 1005 releases at the termination of the last digit.

When relay 209 operates it short-circuits resistance 229, operating relay 728 in the circuit previously traced. Relay 728 closes a locking circuit for itself from battery through the winding of relay 725, right winding and right contact of relay 728 to grounded conductor 704. Relay 725 connects 24-volt battery over its inner left front contact to conductor 627 and thence as previously traced by way of conductor 537, to the winding of relay 207 and 24-volt battery. It also connects 24-volt battery over the inner right contact of relay 727 to conductor 626 and thence as previously traced by way of conductor 529 to the winding of relay 208 and 24-volt battery. The connection of 24-volt battery to the winding of relay 207 causes that relay to release but relay 208 is held operated by relays 215 and 209 as previously described. When relay 207 closes its back contact it connects ground over the left front contact of relay 215 to the winding of relay 218 in shunt of battery through resistance 224, causing that relay to release and disconnect both relays 207 and 208 from the sender. The release of relay 218 also opens the circuit of relay 212 which releases in turn releasing relay 213. The release of relay 218 also opens one locking circuit for relay 1304. When the last digit has been received and relay 1005 released, relay 210 operates in the locking circuit of relay 209 and the second locking circuit of relay 1304 is opened. However, relay 1304 is then held operated over the front contact of relay 1305 until that relay is released by the sender.

Since immediate ringing is not required for a call of this class, as soon as relay 838 operates after the last impulse is transmitted to the test circuit, a circuit is closed from ground on conductor 634, left front contact of relay 838, inner upper contact of transfer relay 949, conductor 932, strap 756, inner right front contact of class relay 710, strap 757, outer left front contact of relay 725, conductor 749, to battery through the winding of relay 605. Relay 605 locks over its lower contact to ground on conductor 634 and removes the shunt from the right high resistance winding of relay 603. The current now flowing through the windings of relay 603 over conductor 527 and through the sensitive relay 1305 and marginal relay 1306 is insufficient to hold relay 1305 operated and that relay releases in turn releasing relay 1304. The release of relay 1304 releases relay 1200 which in turn releases all other operated relays except relay 1201, which remains operated as long as start key 1315 is operated, and relays 1308, 508 and 509 which are held operated by relay 1201. The release of relay 1303 disconnects relays 1305 and 1306 from the windings of relay 603 which thereupon releases in turn releasing relays 606, 600, 701 and 611. When these relays release off-normal ground is removed at the sender and all other operated relays release and restore the sender circuit to normal. The release of relay 600 again connects battery through resistance 602 to conductor 519 to mark the sender as idle.

Since relay 1308 remains locked under the control of relay 1201, as soon as relay 1309 releases, a circuit is closed from battery through the winding of stepping magnet 507 of the sender selector 500, left back contact of relay 510, over the inner upper normal contact of key 561, the corresponding contact of keys belonging to the intermediate sender selectors and key 511, right back contact of relay 1215, upper normal contact of key 1220, right contact of relay 1308, inner right back contact of relay 1309, outer right back contact of relay 1307, left back contact of relay 1214, to ground over conductor 1224 and the middle right contact of relay 1201. At the same time a circuit exists from battery through resistance 1218, winding of relay 1215 and the inner right back contact of relay 1309 and thence to ground as just traced. But relay 1215 cannot operate in this circuit due to a shunt connected from resistance 1218 over the left back contact of relay 1215, right back contact of relay 510, back contact of magnet 507, to ground over the operating circuit of magnet 507. Magnet 507 operates in this operating circuit and removes the shunt from the winding of relay 1215 which in turn operates, opening the circuit of magnet 507 which releases advancing the brushes 501 to 506 into engagement with the next sender. With relay 1215 operated this sender is tested as previously described for busy or idle condition and the test proceeds as above.

*Test of sender progress*

When key 1109 is not operated, the test circuit is arranged to test the sender for the reception and transmission of each digit before advancing to the next digit, with the exception of the delayed pulsing which will be described hereinafter. With key 1109 normal, the sender may be tested for any type of call and, since the simplest case is that of a fixed class without immediate ringing, a call in class C will be used in describing this test. Class key 1103 will therefore be operated, and numerical keys 401, 414, 428 and the seventh and eighth keys in the fourth and fifth rows may be operated by way of example.

The selection and testing of the sender for a busy condition will take place as previously described. With key 1103 operated, battery is connected to conductor 529 and ground to conductor 527 thereby operating relay 614 which locks, extending conductor 529 to the windings of relays 715, 716 and 724 and conductor 537 to the windings of relays 705, 706 and 724.

With key 1109 normal, as soon as relay 1200 operates connecting ground to conductor 223, a circuit is closed from ground on conductor 223, inner upper left normal contact of key 1109, conductor 233, through the windings of relays 205 and 206 in series to battery. Relays 206 and 205 lock to conductor 223 and relay 205 closes a circuit from battery through the winding of relay 216, inner left front contact of relay 205 to grounded conductor 223. Relay 216 closes the previously traced circuit for relays 104 and 105 and these relays lock to conductor 223. Relay 216 also closes the fundamental circuit extending from ground over the middle right contact of relay 216, left winding of relay 1003, right back contact of relay 217, outer lower contact of key 1103, back contact of relay 203, conductor 232, and thence as previously traced by way of conductor 531 through the windings of relays 618 and 619, conductor 538, back to conductor 1112, middle lower contact of key 1103, left back contact of relay 217, right winding of relay 1003 to battery, through resistance 231 over the outer left contact of relay 216. Relay 618 operates in this circuit closing the circuit previously traced for relay 615. With relays 614 and 615 operated, a circuit is closed from ground at the outer upper front contact of relay 614, over the inner upper front contact of relay 615, conductor 718, to the winding of relay 709 and battery.

As previously described, relay 1003 operates in the fundamental circuit causing the successive operation of relays 1007, 1002, 1004 and 1005. As before, relay 1002 locks independent of relay 1007. With key 1109 normal, ground is supplied to the armature of relay 303 over conductor 1110, lower normal contact of key 1109, normal contact of key 1114, right back contact of relay 308, inner left contact of relay 1005, right front contact of relay 214, outer upper normal contact of key 1318, left back contact of relay 1204, inner upper contact key 1221, and grounded conductor 223, as soon as relay 214 is operated indicating that the sender is ready to receive the registration. With key 1109 normal, when relay 303 closes its back contact following the operation of relay 307, the circuit controlled thereby is extended over the left front contact of relay 307, upper right normal contact of key 1109 to the winding of relay 311 and battery. Relay 311 closes a locking circuit through the winding of relay 308, front contact of relay 311, to grounded conductor 1054, relay 308 being held short circuited as long as relay 303 holds its back contact closed. Relays 304 and 305 function to transmit the code for the first digit to the sender. When relay 303 reoperates, relay 308 operates in the locking circuit above traced and removes the ground supplied to the armature of relay 303 so that the pulsing relays remain operated. Relay 308 also opens the locking circuit of relays 306 and 307 which thereupon release. It also closes a circuit from battery through the winding of relay 106, inner right back contact of relay 101, right front contact of relay 104, conductor 1113, right front contact of relay 308, upper left contact of key 1109 to ground on conductor 223. Relay 106 locks through the winding of relay 107 in the usual manner but relay 107 cannot operate being shunted by the operating circuit of relay 106. Therefore, relay 308 in operating after the transmission of the first digit prepares the transfer relays for the next digit.

Since the first digit was 1 ground through resistance 484 is connected over the right contact of key 401, inner right contact of relay 105 and thence by way of the contact of relay 305 and the middle upper contact of key 1103 to conductor 537 and the winding of relays 705, 706, 714, operating marginal relay 706 and sensitive relay 714. Transfer relays 803 and 804 are operated from off-normal ground in the usual manner, therefore, relay 714 operates transfer relay 813 which locks through the winding of relay 814 in the usual manner and relay 706 operates register relay 805 which locks to conductor 800. When the impulse terminates and relay 814 operates, relays 803 and 804 release. A circuit is thereupon closed from battery through the winding of relay 809, upper back contact of relay 810, outer lower back contact of relay 803, straps 651 and 652, conductor 681, outer right back contact of relay 737, conductor 738, straps 653 and 654, conductor 835, inner left front contact of relay 703, conductor 740, outer left back contact of relay 836 to grounded conductor 633. Relay 809 causes the transmission of the first series of impulses in the manner above described and thereafter the timing interval is measured and transfer relay 810 is then operated and locked and transfer relay 809 is released.

Relays 1003 and 1007 follow the impulses from the sender as before, operating the counting relays under the control of key 401 as before. If the correct number of impulses is received, relays 1021 and 1031 will operate and in turn release relays 1002, 1004, 1005 and 1007. The release of relay 1005 releases all of the operated counting relays as well as relays 308 and 311. The release of relay 308 permits relay 107 to operate in the locking circuit of relay 106. Relay 107 releases relays 104 and 105 as before and prepares the circuits for transmitting the second digit. The release of relay 308 again connects ground to the armature of relay 303. The release of the counting relays reestablishes the circuit for relay 1007 which also reoperates relays 1002, 1004 and 1005. As soon as relay 1005 is reoperated, relay 303 functions to operate relays 306 and 307 in turn. Following the operation of relays 306 and 307 relays 304 and 305 transmit the second digit to the sender while relay 303 reoperates relay 311. This operation is continued for each digit until the fifth digit has been transmitted.

The inner lower movable contact of key 1103 will be connected to the front contact of the relay corresponding to relay 104 for the fifth digit in the same manner that the similar contacts of keys 1104 and 1106 are connected to the front contact of relay 110. The normal contact of this movable contact is connected to the winding of the relay corresponding to the sixth digit so that with the key normal the operation of the fifth digit relay prepares a circuit for the sixth digit relay in the usual manner. With key 1103 operated, the operated contact extends in parallel with the similar contacts of the other class keys to conductor 1111 and therefore when relay 308 operates, following the transmission of the fifth digit a circuit is closed from battery through the winding of relay 209, right back contact of relay 210, front contact of relay 205, over the inner lower front contact of key 1103, front contact of the fifth digit relay, back contact of the fourth digit relay and relays 108, 106, 103 and 104, conductor 1113, right front contact of relay 308, outer upper left contact of key 1109, to grounded conductor 223. Relay 209 locks through the winding of relay 210 to grounded conductor 223. When the fifth digit has been received from the sender, relay 308 releases and relay 210 operates. From this point the release of the sender and the advance of the test circuit progresses as for the previous test.

Test of delayed dialing

The circuit of the sender disclosed in the Henry patent provides by the closure of straps 651 to 663, 862 to 865, 955 and 956, that for variable classes the first digit shall not be transmitted until the second digit has been received and that the second digit shall not be transmitted until the third digit has been received. With these straps closed, the circuit for operating relay 809, on a variable class, where relay 737 is operated, extends from battery through its winding, over the upper back contact of transfer relay 810, lower back contact of relay 803, straps 651 and 652, conductor 681, outer right front contact of relay 737, conductor 767, straps 655 and 656, conductor 871, strap 862, lower back contact of transfer relay 813, straps 657 and 658, conductor 835, inner left front contact of relay 703, conductor 740, outer left contact of relay 836 to ground on conductor 633 and therefore is not closed until the second digit has been received and transfer relay 813 has been released. Similarly the circuit of transfer relay 819 extends over the upper back contact of relay 820, upper front contact of relay 810, strap 863, conductor 870, straps 661 and 660, conductor 642, inner right front contact of relay 737, conductor 758, straps 659, 864 and 865, back contact of relay 823, straps 662 and 663 to conductor 835 and ground as above traced. It is possible, as set forth in that patent, to delay any one or two of the first three digits or not to delay them at all, according to the closure of the various straps.

The test circuit must therefore be equipped to meet the sender conditions and relays 101, 102 and 103 are provided for this purpose. If only one digit is to be delayed only one set of these relays is required, but as many sets are required as there are digits which may be delayed. For convenience, only one set of these relays has been shown. If none of the digits were to be delayed in any class, straps 120 to 125, and 140 to 145 would be closed and the relays 101 to 103 omitted. If only the first digit is to be delayed relays 101 to 103 are inserted as shown with straps 140 to 145 closed. If, for example, only the second digit were to be delayed straps 120 to 125 would be closed and relays 101 to 103 inserted in place of straps 140 to 145, which correspond in location to straps 120 to 125. Since the sender is arranged to delay the first two digits it will be assumed that straps 120 to 125 will be opened and that a second group of relays, such as relays 101 to 103 are inserted in place of straps 140 to 145. In addition, conductors 146 to 151 will be connected to the second group of relays in precisely the same manner that conductors 126 to 131 are connected to the first group of relays. Relay 101 and the corresponding relay of the second group operate in parallel from the class keys.

If now the sender is to be tested for a variable class, for example, class B, with key 1109 normal, class key 1106 will be operated closing a circuit, when relay 1200 operates, from grounded conductor 223, inner lower left contact of key 1109, inner upper contact of key 1106, conductor 1115, through the winding of relay 101 and the delay relay of the second group in parallel to battery. Relay 101 and the other delay relay operate. The same test number may be used as for the first variable class call above described.

Relays 104 and 105 are operated and the first digit is transmitted as previously described, resulting in the operation of the transfer relays 813 and 814 and the release of transfer relays 803 and 804 in the sender. When relay 303 closes its back contact at the same time that the first digit is being transmitted relay 311 operates as previously described, locking through the winding of relay 308 which operates at the termination of the digit. Since relay 101 is operated, relay 308 in operating closes a circuit from grounded conductor 223, outer upper left normal contact of key 1109, right front contact of relay 308, conductor 1113, right front contact of relay 104, right front contact of relay 101, winding of relay 103 to battery. Relay 103 locks through the winding of relay 102, inner left contact of relay 103, left back contact of relay 107 to grounded conductor 223. Relay 103 also closes a circuit from battery through the winding of relay 1001, outer left contact of relay 103, left back contact of relay 102, left back contact of relay 107, to grounded conductor 223. Relay 1001 connects ground from the middle right contact of relay 1002, over the inner right front contact of relay 1001, lower right normal contact of key 1109, conductor 1110, to the armature of relay 303. Relay 308 in operating also opens the locking circuit of relays 306 and 307. Therefore, with relay 1001 operated, a circuit is closed from battery through the winding of counting relay 1020, back contact of relay 1030, back contact of relay 1011, outer right front contact of relay 1001, left back contact of relay 1009, left front contact of relay 1006, back contact of counting relay 1031, left front contact of relay 308, left back contact of relay 307, outer left back contact of relay 219, to the back contact of the armature of relay 303 to which ground is connected by relay 1001. Therefore, the counting relays are successively operated under the control of interrupter relay 303 to measure off a time interval. When relay 1031 operates, it opens the locking circuit of relay 1002 thereby permitting relays 1002, 1004 and 1005 to release. The release of relay 1002 disconnects ground from the interrupter relay 303 while the release of relay 1005 opens the locking circuit of relays 308 and 311 permitting these relays to release. Relay 1005 also opens the locking circuit for the counting relays permitting them to release.

The release of relay 308 permits relay 102 to operate in the locking circuit of relay 103 and the operation of relay 102 releases relay 1001 which permits relays 1002, 1004 and 1005 to reoperate. Relay 102 also opens the locking circuit of relays 104 and 105 permitting these relays to release and with relay 103 operated and relay 104 released, relay 106 operates, locking through the winding of relay 107 to the back contact of the second delay relay corresponding to relay 102.

With relay 106 operated, relay 303 receives ground over conductor 223, inner upper normal contact of key 1221, back contact of relay 1204, upper normal contact of key 1318, right front contact of relay 214, left front contact of relay 1005, right back contact of relay 308, outer left contact of relay 106, left front contact of relay 101, right lower normal contact of key 1109 and conductor 1110. The pulsing circuits for the second digit extends from the contact of relay 305, outer right contact of relay 307, over the inner right contact of relay 102 to the inner right contacts of the second row of keys, and from the contact of relay 304, inner right contact of relay 307, middle right contact of relay 102, to the outer right contacts of the second row of keys. Since key 414 is operated, the latter circuit extends over the contact of key 414 through a high resistance 481 to battery, thereby transmitting an impulse which will operate the polarized relay 715 and the sensitive relay 724 in the sender, in turn operating register relay 817 and transfer relays 823 and 824, which release relays 813 and 814. During the transmission of the second digit relay 311 is operated, locking through relay 308 which operates at the end of the digit.

With relays 813 and 814 released, transfer relay 809 operates in the circuit above traced, causing the transmission of the first digit to the test circuit. With relay 1001 released, the test circuit is ready to check this digit and the counting relay circuit extends as previously traced to the right back contact of relay 1001, and thence over the outer right contact of relay 102, the left normal contact of key 404, and the left operated contact of key 402 to the winding of relay 1022 and battery. When relay 1031 operates, relays 1002, 1004 and 1005 are released, in turn releasing relays 311 and 308. With relay 308 released, relay 107 operates in the locking circuit of relay 106, releasing relays 102 and 103 and operating the relay corresponding to relay 103 in the second delay group. This relay reoperates relay 1001, whereupon the counting relays are reoperated to measure a time interval and then the third digit is transmitted, after which the second digit is received and checked. The remaining digits are transmitted and checked in the same manner as for the fixed class above described. The 10-pulse time interval above described is introduced by the test circuit to check the ability of the sender to delay pulsing out a digit that has been registered and, should the sender pulse during this interval, relay 1011 would operate over the front contact of relay 1002 and the back contact of relay 1007 causing the circuit to time out with lamps 323, 324 and the counting relay lamps lighted.

*Start key operation*

For variable classes where the connection to be established does not require the registration of the maximum number of digits the operator presses her start key following the operation of the last numerical key. The start code consists of a heavy positive pulse on the tip side of the pulsing circuit and a light negative pulse on the ring side of the pulsing circuit. When testing the sender for its reaction to the start code, the test key set is arranged so that both the No. 4 and the No. 1 key in one row may be operated. Assuming, for example, that the sender is to be tested for its action in signaling a zero operator, the number zero key 410 in the first row of keys and the No. 4 and No. 1 keys 414 and 411 in the second row will be operated. Since this is a variable class call and one where immediate ringing would not be required, class key 1106 may again be operated. The code for the digit zero will be transmitted by the key pulsing relays, a light positive pulse will be transmitted from ground at the middle left contact of relay 1201, through high resistance 483, right contact of key 410, and the middle right contact of relay 105, inner right contact of relay 307, to the armature of relay 304 and thence as previously traced to conductor 537, the windings of relays 715, 716 and 724 and battery. Only relay 724 operates to cause the operation of transfer relay 813, none of the register relays 805 to 808 being operated. For transmitting the start signal a circuit is closed from battery through high resistance 481, outer right contact of key 414, either over the back contact of relay 101 and the middle right contact of relay 107, or over the middle front contact of relay 102, depending on the delay condition above described, to the armature of relay 304, and the windings of relays 715, 716 and 724, operating polarized relay 715 and sensitive relay 724. A second circuit is closed from ground at the middle left contact of relay 1201, low resistance 484, right contact of key 411, either over the left back contact of relay 101 and the inner right contact of relay 107 or over the inner right front contact of relay 102 to the armature of relay 305 and thence to conductor 529, the windings of relays 705, 708 and 714 and battery, operating marginal relay 706 and sensitive relay 714. Relays 714 and 724 together cause the operation of the transfer relay 823. Relay 715 closes a circuit for operating relay 817, and at the same time operates relay 729 in parallel therewith. Relay 706 closes a circuit for operating register relay 815 and also connects ground to the front contact of relay 729 thereby completing a circuit over the armature of relay 729 to the winding of relay 753 and battery. Relay 753 locks over its front contact to grounded conductor 704. When the impulse recording relays release, transfer relay 824 operates in series with relay 823, releasing relays 813 and 814. Relay 729 also releases and with relay 753 operated, a circuit is closed from ground on the front contact of relay 753 over the back contact of relay 729 to the winding of relay 755 and battery. Relay 755 operates and closes a circuit in series through the windings of relays 612 and 625, conductor 649, outer right contact of relay 755 to grounded conductor 704. Relay 612 operates as previously described to prepare for the transmission of pulses to the test circuit. Assuming that straps are located so as to delay the transmission of the first digit until after the reception of the second digit (in this case the start combination), following the release of relays 803 and 813, relay 809 will be operated and the digit 0 transmitted.

When relay 107 operates, a circuit is closed from ground at the left front contact of relay 107 over the inner left contact of key 411, inner right contact of key 414, back contact of relay 108, right front contact of relay 205, and the back contact of relay 210, winding of relay 209 and battery. Relay 308 in operating closes a circuit for relay 109 in the usual manner and permits relay 210 to operate in the locking circuit of relay 209. Relays 209 and 210 function to indicate the termination of the selections as previously described. It may be noted that with keys 471 and 474 operated, that is, with the start combination registered on the last row of keys, relays 209 and 210 are operated in series directly from relay 111.

Test of ringing

It is to be noted that for calls in class A or class B immediate ringing may or may not be required. For class A, which is a fixed class, relays 614 and 616 are operated, in turn operating class relay 707, while for class B which is a variable class, relays 613 and 615 are operated resulting in the operation of class relay 710. For class A, therefore, the operation of relay 838 at the termination of the fourth and last digit closes a circuit from ground on conductor 634 over the left front contact of relay 838, inner upper front contact of transfer relay 909, conductor 912, inner right front contact of class relay 707, strap 745, conductor 746 to battery through the winding of relay 638. Relay 638 operates and at its upper back contact removes ground from the armature of relay 731 causing relays 730 and 731 to remain operated. When a connection has been established, reverse battery is connected to the fundamental circuit. Relay 618 operates, closing a circuit from grounded conductor 704, front contact of relay 618, outer lower front contact of relay 616, to the winding of relay 636 and battery. Relay 636 locks directly to grounded conductor 704. Relay 636 closes a circuit from battery through the windings of relays 837 and 836 in series, conductor 754, upper front contact of relay 636, conductor 635, inner lower front contact of transfer relay 909, conductors 630, 629 and 628 to ground at the inner upper front contact of relay 611. Relay 910 now operates in the locking circuit of relay 909 and locks independently of relay 909 to ground on conductor 900. Relay 836 releases relays 840 and 841. At the completion of registration, the sender relays 728 and 725 are operated by the test circuit in the manner previously described. With relay 725 operated the operation of relay 636 closes a circuit from battery, winding of ringing relay 617, lower back contact of relay 645, conductor 646, outer right front contact of relay 725, conductor 747, outer lower front contact of relay 638, lower front contact of relay 636 to grounded conductor 704. Relay 617 upon operating connects source of ringing current 647 to the ring conductor 538 of the fundamental circuit and generator ground to the tip conductor 531 of the fundamental circuit, disconnects the windings of relays 618 and 619 from the fundamental circuit and connects ground from conductor 635 over its inner lower front contact to conductor 639 and the armature of relay 731, thereby rendering relays 730 and 731 again effective to successively deenergize and energize. With relays 836 and 837 now operated, upon the first deenergization of relay 731 ground on its armature is extended over its back contact, conductor 743, right front contact of relay 836, conductor 856, lower back contacts of transfer relays 950, 940, 930, 920, lower front contact of transfer relay 910, conductor 921, outer left back contact of class relay 709, conductor 748, conductor 922, left back contact of relay 848 to battery through the winding of relay 849. Relay 849 operates and locks through the winding of relay 848, and upon the energization of relay 731 relay 848 operates in the locking circuit as previously described. Counting relays 847, 846, 845 and 844 operate in succession, as relay 731 continues to deenergize and energize. Relay 844 upon operating opens the locking circuit of relays 839 and 838, which release and in turn cause the release of relays 638 and 617. The relay 617 now disconnects the source of ringing current, connects the windings of relays 618 and 619 to the fundamental circuit and disconnects ground from the armature of relay 731 whereupon relays 730 and 731 remain operated. Relay 638 upon releasing closes a circuit from ground on conductor 704, lower front contact of relay 636, lower back contact of relay 638, conductor 648, outer left front contact of relay 725, conductor 749 to battery through the winding of relay 605. With relay 605 operated, the sender is released in the manner previously described.

In order to test this function of the sender, key 316 is operated. The circuit functions during registration and impulsing as previously described until relay 209 operates following the reception of the last digit. This relay in operating closes a shunt around resistance 229 which, with key 1105 operated and relays 614, 616 and 707 operated in the sender reduces the resistance in series with marginal relay 728 so that this relay operates, locking in a circuit from battery through the winding of relay 725, right winding and contact of relay 728 to grounded conductor 704. When relay 210 operates it closes a circuit from battery through the winding of relay 217, outer upper operated contact of key 316, left front contact of relay 210 to grounded conductor 223. Relay 217 opens the circuits through the windings of relay 1003 and the windings of relays 618 and 619 and connects relays 618 and 619 over its outer left front contact to ground through resistance 234 and over its outer right contact to battery through resistance 235. The current flow under this condition is in the opposite direction from that through the windings of relay 1003 and therefore is in a direction to operate relay 618. The resistances are proportioned to make an operate test of that relay and, if the relay is properly adjusted, it operates, closing a circuit from grounded conductor 704, over the front contact of relay 618, outer lower front contact of relay 616, winding of relay 636 to battery. Relay 636 operates and locks to conductor 704. This relay functions as above described to cause the connection of ringing current from source 647 over the upper front contact of relay 617 to conductor 538 and thence as previously traced to conductor 1112 through condenser 201 and winding of ringing relay 202 to ground at the inner left front contact of relay 217. Relay 202 operates under the control of the ringing current and in turn operates relay 203 which connects the generator ground connected by relay 617 to conductors 531 and 232 over the front contact of relay 203 to the winding of relay 204 and battery. Relay 204 locks to grounded conductor 223. Relay 210 in operating opens one locking circuit for relay 1304 and relay 204 in operating further opens the locking path of relay 1304. Relay 217 also closes a circuit for lamp 322 so that if the sender fails to supply ringing current and ground as above and relay 1304 does not release, the time alarm circuit functions and lamps 321, 322 and 323 being lighted will indicate the point at which the failure occurs. If the failure occurs because relay 728 fails to operate, relays 207 and 208 will not release and lamps 321, 323 and 326 will be lighted.

The release of relays 207 and 208 causes the release of relay 218 completing the removal of locking circuits for relay 1304 and this relay releases when the sender increases the resistance in series with relay 1305 until that relay releases.

The advance of the test circuit to the next sender is the same as for the first test described.

If the class key indicates that ringing may be received and it is desired to test the sender for its ability to cancel the immediate ringing, key 315 is operated, connecting relays 207 and 208 to the opposite conductors from those to which they are normally connected. This transfers the non-operate test from relay 728 to relay 727, and when relay 218 operates applies the operate test to relay 727. Relay 727 in operating causes the restoration of the sender to normal without the application of ringing current to the fundamental circuit.

Check of improper pulsing

As previously described, if the sender transmits less than the proper number of pulses, counting relays 1021 and 1031 will not be operated and relays 1002, 1004, 1005 and 1011 will remain operated, relays 1006, 1003 and 1007 also remaining operated during the interval between digits. The prolonged operation of relay 1007 permits the shunt around the winding of relay 1010 to remain closed long enough for that relay to release and open the counting relay circuit, permitting the time alarm to function. The lamps in the series 1040 to 1049 associated with the operated counting relays will be lighted, as well as the lamp 323 and the lamp of group 331 to 339 corresponding to the digit which was being received when the failure occurred.

If the sender transmits more than the proper number of pulses, a circuit will be closed from battery through the winding of relay 1008, inner left contact of relay 1001, outer lower right normal contact of key 1101, left back contact of relay 222, left front contact of relay 1031, left contact of relay 1010 to the back contact of relay 1003 and thence over the counting relay circuit to ground. Relay 1008 locks to grounded conductor 1223 and operates relay 1009. Relay 1009 lights lamp 1050, holds relay 1005 operated and opens the normal counting relay circuit. The time alarm functions and the counting relay lamps, the digit lamp and lamps 1050 and 323 indicate the point at which difficulty was encountered.

Test for premature disconnection

In the sender if a disconnection occurs before the sender has completed its function, relay 609 is operated to bring about the automatic release of the sender. In order to test this function, the zero digit keys 410, 420, 430, etc., to 480 are operated. Likewise key 1199 is operated and a class key such as key 1106 which will permit the registration of the maximum number of digits, together with the preliminary disconnect key 301, followed by the start key 1315. The call will then progress as in the first test described until all of the digits have been registered and the first digit has been transmitted from the sender to the test circuit. With key 301 operated, relay 211 operates over the back contact of relay 206 in parallel with relay 1304 when relay 1305 operates in the circuit of relay 603. Relay 211 locks under the control of relays 1312 and 1305 independent of key 301 and relay 206. When relay 603 operated in the sender, relays 606 and 600 were operated, preparing a circuit from battery through the lower winding of relay 609, left front contact of relay 703, inner right front contact of relay 600, to conductor 519. When relay 218 operated it extended this circuit from conductor 519, brush 506, outer right contact of relay 509, right back contact of relay 221, inner lower operated contact of key 301, outer right contact of relay 218 to grounded conductor 223, supplying a non-operate test to relay 609.

After the registration has taken place and the first digit has been received from the sender, relay 107 is operated, closing a circuit from ground at its left front contact, inner right contact of relay 206, outer upper operated contact of key 301, to the winding of relay 221 and battery. Relay 221 in operating transfers the circuit of relay 609 over its front contact through resistance 236 in parallel with the resistance 237 and the outer right contact of relay 211, to the inner right contact of relay 216 and grounded conductor 223. Relay 609 should operate in this circuit.

Relay 609 closes a circuit from ground at its front contact, back contact of relay 605, winding of relay 645 to battery. Relay 645 locks over its outer upper contact to grounded conductor 634. Relay 645 also closes its locking ground to the winding of relay 605 which operates and locks to conductor 634. Relay 605 opens the shunt around the high resistance right winding of relay 603 permitting relays 1305 and 1306 to release. Relay 645 also closes a circuit from battery through the winding of relay 604, outer upper contact of relay 645 to grounded conductor 704. Relay 604 further opens a shunt around the high resistance winding of relay 603. It also opens the fundamental circuit releasing relays 1003 and 1007.

Relay 1305 in releasing also releases relay 211, thereby opening the shunt through resistance 237 around resistance 236 and imposing a release test on relay 609. Relay 609 in releasing closes a circuit from ground over its back contact, inner lower front contact of relay 645 to the left winding of relay 603, thereby reducing the resistance of that relay to five ohms. Relay 1305 reoperates and, due to this low resistance, relay 1306 also operates. Relay 1306 closes a circuit from battery through the winding of relay 219, left back contact of relay 220, inner upper operated contact of key 301, inner upper normal contact of key 1318, upper normal contact of key 1324, front contact of relay 1306, back contact of relay 1204, outer lower normal contact of key 316 to grounded conductor 223. Relay 219 locks through the winding of relay 220 and the middle right contact of relay 219 to grounded conductor 223, but relay 220 remains shunted as long as relay 1306 is held operated by relay 603 remaining operated through its 5-ohm winding. Relay 219 operates relay 222 over grounded conductor 223 for the purpose of determining whether relay 603 can remain operated through its 5-ohm winding over a period of at least one second. Relay 219 closes a circuit from the winding of relay 1002 to grounded conductor 223 and relay 1002 locks under the control of key 1101 and relay 1031 to conductor 223. Relay 1002 in turn operates relays 1004, 1006, and 1005. Relay 1006 locks to conductor 1223. With relay 219 operated, the back contact of relay 303 is connected over the left front contact of relay 219, left back contact of relay 1031, left front contact of relay 1006, back contact of relay 1009, right back contact of relay 1001, outer right contact of relay 107 which is operated preparatory to transmitting the second digit, left contact of key 420, back contact of relay 1030 to the winding of relay 1020 and battery. The counting relays operate successively under the control of interrupter relay 303 and when relay 1031 operates, if relay 220 has not operated, the impulsing circuit will be extended over the left front contact of relay 1031, left front contact of relay 222, right back contact of relay 220, right winding of relay 1312 to battery. Relay 1312 locks over its left winding and left front contact to ground at the front contact of relay 1305, and opens the holding circuit of relay 1304 thereby releasing relay 1200 and restoring the test circuit to normal. The restoration of the test circuit opens the ciruit of relay 603 which releases permitting the sender to return to normal.

If relay 609 operates during the non-operate test, it opens the shunt around the high resistance winding of relay 603 as described, and releases relays 1305 and 211, relay 1304 remaining operated in its locking circuit. Relay 211 released, connects ground from conductor 223 over the left back contact of relay 211, middle lower operated contact of key 301, left back contact of relay 209, inner lower right operated contact of key 1109 to the locking circuit of relay 1002 holding that relay as well as relays 1004 and 1005 operated, preventing the advance of the test. Lamps 323, 324, first digit lamp 332 and the counting relay lamp will be lighted to indicate that the sender failed at this point in the test. If relay 609 fails to operate when the operating circuit is closed, relay 221 which is now operated will provide a holding circuit for relays 1002, 1004 and 1005 and the time alarm will function. If relay 603 fails to hold with only its 5-ohm winding energized, relay 1306 will release permitting the operation of relay 220. Relay 220 in operating opens the circuit by which relay 1312 is operated and prevents the restoration of the test circuit to normal.

Jack 1323 permits testing the flow of the current supplied over the contacts of relays 726 and 725 to the windings of relays 207 and 208 at the termination of a call. The tip and ring of the jack are in parallel with the pulsing tip and ring conductors and the contact controlled by the ring of the jack holds relay 1304 operated. This test is conducted on a manual basis and the circuit is advanced to the next sender by operating the control advance key 1116 which in turn operates relay 1307 to advance the circuit as will de described hereinafter.

*Test of pulsing speed*

This circuit may also be employed on a manual basis to test the pulsing speed of the sender. For this test key 1101 is operated, together with key 409 and any one of the class keys. The start key 1315 is, of course, also operated. With key 1101 operated, relays 1305 and 1306 are disconnected from conductor 527 so that relay 603 is not operated, but they are connected to ground through resistance 1117, which holds relay 1305 operated. The sender is tested for busy or idle condition by relay 1209 in the usual manner. When the sender is idle, relay 1209 operates followed by the usual operations resulting in the lighting of lamp 326. Ground through the front contact of relay 1209 marks the sender busy to link circuits.

Each sender is provided with a make busy jack such as jack 512 and a busy lamp such as lamp 513 which are connected to the sender over conductors 514, 515 and 516. After the sender has been selected and found idle, the attendant inserts a test plug, having the tip and ring contacts connected together, in the make busy jack of the sender engaged by the sender selector. Assuming that jack 512 belongs to the sender shown, the insertion of the plug in jack 512 will close the tip contact and connect ground to conductor 515, thereby operating make busy relay 601. Relay 601 opens the time alarm circuit and disconnects the idle battery from conductor 519. With the plug in the jack and key 1101 operated, a circuit is closed from grounded conductor 1223, inner lower right operated contact of key 1101, ring of jack 512, through the plug (not shown), tip of jack 512, conductor 514, outer left front contact of relay 601, conductors 629 and 630, resistances 732 and 733, to the windings of relays 730 and 731. Ground from conductor 514 also extends over the inner left front contact of relay 601, outer right back contact of relay 600, back contacts of relays 636, 637, 638 and 604, conductor 639 to the armature of relay 731, thereby causing these relays to function as a pulse generator. The first pulse from relay 731 operates relays 853 and 854 in succession and these relays lock over the front contact of relay 854, back contact of relay 838, conductor 634, right front contact of relay 601, to ground over conductor 514. With relay 854 operated, relay 711 is operated as previously described and relay 730 intermittently opens the fundamental circuit over conductors 531 and 538 in the usual manner. Relays 205, 206 and 216 having been operated as previously described, conductors 531 and 538 extend to the windings of relay 1003 which operates, in turn operating relays 1007, 1002, 1004, 1005 and 1006. When the circuit is interrupted by relay 730, relays 1003 and 1007 follow the pulses, and the counting relay circuit extends, since key 409 is operated, to the winding of the No. 9 counting relay 1029. Subsequent pulses cause the other counting relays to operate in turn. Since key 1101 is operated, the locking circuit for the No. 2 to No. 9 counting relays extends over the outer upper right operated contact of key 1101 and the inner upper right operated contact of key 1101, right back contact of relay 1031 to grounded conductor 223. Therefore, when relay 1031 operates, all of the previously operated counting relays release. With relay 1031 operated, the pulsing circuit extends over the front contact of relay 1031, left back contact of relay 222, outer lower operated contact of key 1101, back contact of relay 1030 to the winding of relay 1020 and battery. The locking circuit for the No. 0 counting relays 1020 and 1030 may be traced over the outer upper left operated contact of key 1101 to ground at the right back contact of the No. 5 counting relay 1035. The locking circuit for the No. 1 counting relays 1021 and 1031 extends over the inner upper right operated contact of key 1101 to ground at the right back contact of relay 1030, so that the operation of relay 1030 releases relay 1031 and these counting relays are restored to their original condition, whereby the next pulse may cause the operation of the No. 9 counting relay. The counting relays are operated in succession and when relay 1035 operates, relays 1020 and 1030 release. This condition continues and with the lamp key 312 operated, lamp 1041, for example, flashes once for each ten pulses received. This flash should occur about once per second but pulses between fifty-seven and sixty-six per minute are satisfactory. Although lamps 1042 to 1040 will flash at the same rate, they may conveniently be masked during the timing operation. The speed of flashing may be determined by the use of a stop watch or other accurate timing device.

When it has been determined whether or not the rate of pulsing is satisfactory, key 1116 is operated, causing the selector to be stepped to the next terminal and lamp 325 will light if that terminal is equipped and the sender is idle. The make busy plug is then moved to the jack of this sender and the test made as described above.

Jack 1320 permits a pulse measuring set to be connected to the fundamental tip and ring conductors for determining the relative open and closed periods of the sender pulsing. This test may follow the pulse speed test above described, or may be made independently, the make busy plug being used to cause the sender to pulse in either case.

*Test for reorder signal*

This sender is arranged to cause the transmission of a reorder signal to the operator under a variety of conditions, for example, if the trunk gives to the sender an indication of a fixed class and the operator uses the start key before the required number of digits have been registered. Likewise, even in variable classes, it may not be possible to complete calls using every possible number of digits. The sender is therefore wired to produce a reorder signal if the operator sets up a number of digits corresponding to a type of call which can not be completed in the indicated class. The sender also gives a reorder signal if its timing circuit completes operation before the complete registration of a number or the complete transmission of a designation. This signal is produced by shunting the middle and right windings of relay 603 so that a 5-ohm ground is connected to conductor 527.

In order to test whether the sender performs this function properly, keys 1109 and 1324 are operated, as well as one of the fixed class keys, for example key 1105 and the No. 1 and No. 4 keys in the first or second row, for example, keys 411 and 414. The test circuit will connect with the sender and start registration in the manner described. Class key 1105 causes the operation of relays 614, 616 and 707 in the sender, and the transmission of the start code will operate relays 706 and 715 as in the case of the variable class. Relay 753 is operated as described and when relay 729 releases, a circuit is closed from grounded conductor 734, front contact of relay 753, back contact of relay 729, winding of relay 755 and battery, and in parallel therewith over the back contact of relay 737 (which is operated for a variable class, but is now normal), and conductor 650 to the winding of relay 604 and battery.

Relay 604 opens the fundamental circuit, stops the pulsing relays and closes a shunt around the right and middle windings of relay 603, extending over the inner lower back contact of relay 645, upper alternate contacts of relay 604 to ground at the upper back contact of relay 605 thereby reducing the resistance of this circuit to five ohms and permitting marginal relay 1306 to operate. Relay 1306 closes a circuit from battery through the right winding of relay 1312, upper operated contact of key 1324, front contact of relay 1306, back contact of relay 1204, outer lower normal contact of key 316 to grounded conductor 223. Relay 1312 locks under the control of relay 1305 and opens the circuit for relay 1304, causing that relay to release, restore the test circuit to normal and advance it to the next sender.

The sender shown is arranged to cause a reorder signal, if the operator, having selected a class D trunk, sets up a five digit number. For this purpose the upper front contact of transfer relay 933 is strapped to conductor 873. The digits will be recorded and transfer relays 933 and 934 will remain operated after the start combination is recorded. The digits are then transmitted by the sender as recorded and when relay 838 operates at the time the last impulse is transmitted, a circuit is closed from ground on conductor 634, left front contact of relay 838, inner upper front contact of transfer relay 919, conductor 931, upper front contact of transfer relay 933, strapped to conductor 873, outer left front contact of relay 755, conductor 650 to battery through the winding of relay 604. Relay 604 functions as above described to shunt the windings of relay 603 and reduce the resistance in conductor 527 to five ohms, releasing the sender.

Testing the sender for this type of reorder signal takes place in the same manner as for the fixed type of call except that a variable class key 1103 or 1104 is operated and that the start combination is recorded on the sixth row of keys, any desriable numerical key being operated on the first five rows.

In testing the sender for a reorder signal following the operation of the timing circuit, key 1318 is operated. With this key operated, the test circuit will test and pick a sender as described above, but no registration will be made. Key 1318 at its outer upper contact opens the ground supplied to the armature of relay 303 for starting the operation of the pulsing relays thereby preventing the registration of any digit in the sender. At its inner upper contact, key 1318 transfers the circuit controlled by relay 1306 from relay 204 to the winding of relay 1312, to check for the reception of the reorder 5-ohm ground. In addition it rearranges the time alarm circuit so as to provide a longer period during which the sender may time out.

In the sender, the operation of relay 600 connected ground to conductor 607 extending to a time alarm circuit (not shown). When the timing circuit is ready to function, ground is connected from the timing circuit to conductor 608 and thence over the inner left front contact of relay 699, conductor 682 to battery through the right winding of timing relay 700. Relay 700 operates and locks over its left winding and left contact to ground on conductor 704 and connects the right winding of timing relay 770 over its right contact to the timing lead 769. After an interval, ground will be applied to conductor 769 thereby operating relay 770. Relay 770 at its outer right contact closes a circuit from ground over conductor 771, right back contact of relay 601 to alarm lead 683 and closes a circuit from ground on conductor 704 over its outer left front contact and conductor 650 to battery through the winding of relay 604.

Relay 604 upon operating opens the fundamental circuit and disconnects ground from the armature of pulsing relay 731, holding relays 730 and 731 operated. It closes a shunt around the right and middle windings of relay 603 as is previously described. This permits the marginal relay 1306 to operate in turn operating relay 1312 which releases relay 1304, restores the sender and test circuit to normal and causes the test circuit to advance to the next sender.

Operation of sender selector

When the sender selector steps to a set of terminals which is not connected to a sender, for example, to the set of terminals marked by terminal 517 of brush 506, relay 1215 is operated as previously described. The operation of relay 1215 in turn operates relay 1206 which connects the windings of relay 1209 to brush 506 in the usual manner. Since brush 506 is now engaging terminal 517, this circuit extends over the left front contact of relay 1206 to the winding of relay 1207 instead of to battery in an idle sender. Relay 1209 operates in this circuit, connecting ground through its left winding to brush 506 and operating relay 1207. Relay 1207 in turn operates relay 1208. Relay 1208 closes a circuit from battery through the left winding of relay 1308, front contact of relay 1208, back contact of relay 1200, conductor 1222, right back contact of relay 1307, back contact of relay 1214 to grounded conductor 1224. Relay 1308 locks over its left front contact and conductor 1222 to ground as above traced. Relay 1209 also operates relay 1310 as during a normal connection, which in turn operates relays 1311, 1303 and 1309. Relay 1309 opens the operating circuit for relay 1215 which releases, in turn releasing relay 1206. The release of relay 1206 releases relay 1209 causing relays 1207, 1310, 1311, 1303 and 1309 to release. The release of relay 1309 closes a circuit from battery through the stepping magnet 507, outer left back contact of relay 510, contact of keys 561 and 511 and the intermediate selector keys, the right back contact of relay 1215, upper normal contact of key 1220, right front contact of relay 1308, inner right back contact of relay 1309, back contact of relay 1307, left back contact of relay 1214 to grounded conductor 1224. A circuit for relay 1215 extends in parallel over the back contact of relay 1309 to ground, but relay 1215 is held shunted by a circuit from battery through resistance 1218, left back contact of relay 1215, right back contact of relay 510, back contact of magnet 507, to ground over the operating circuit of magnet 507. When magnet 507 opens its contact, relay 1215 operates causing the selector to advance to the next sender. If the test is started with the selector on the twenty-second terminal, which is connected in parallel with terminal 517 and all such unequipped terminals, a similar action takes place.

When the twenty-first terminal of the sender selector has been reached, relay 1209 operates in the same manner as for unequipped terminals, operating relay 1207. Relay 1207 connects ground over its left contact and the left front contact of relay 509 to brush 503 and the left winding of relay 510. Relay 510 locks through its right winding and inner right front contact, lower normal contact of keys 511, 561 and the keys of the intermediate selectors, right normal contact of relay 1213 to ground at the middle right contact of relay 1201. In a similar manner, when each of the successive sender selectors are advanced to their twenty-first terminals, the relays corresponding to relay 510 will be operated and locked. Assuming that switch 550 is the last sender selector, when the twenty-first terminal of that switch is reached, relay 560 is operated and locked and a circuit is closed from battery through the winding of relay 1211, left front contact of relay 560, left front contacts of the relays corresponding to relay 560 for the intermediate sender selectors, left front contact of relay 510, inner normal contacts of key 511, the intermediate keys and key 561, right normal contact of relay 1213 to grounded conductor 1224. Relay 1211 connects ground to the winding of each sender selector magnet. It also connects ground from conductor 1224 over the outer right contact of relay 1211, left normal contact of relay 1213 to the winding of relay 1212 and battery. Relay 1212 in turn connects relay 1213 to grounded conductor 1224 and connects this same ground to the locking circuit of relays 510, 560, etc. to prevent their premature release. Relay 1211 also closes a circuit from grounded conductor 1224 to the winding of relay 1214 which operates and locks over its left front contact to conductor 1224. Relay 1214 connects ground to lamp 1225, indicating that the tests have been completed and connects ground to the winding of relay 1205 which lights lamp 1226 and closes a circuit at its left contact for an audible signal to notify the attendant that the test has been completed. Relay 1213 is slow to operate and relay 1212 is slow to release, in order to allow sufficient time for the operation of the stepping magnets 507, 557, etc. Relay 1213 holds over its left and right front contacts to conductor 1224 and opens the circuit of relay 1212 which releases. When relay 1212 releases, the locking circuit for relays 510 and 560 is opened and these relays release, in turn releasing relay 1211. With relay 1211 released, the circuits of the stepping magnets are opened and each will advance to the twenty-second terminal of its arc.

When the attendant responds to the audible alarm caused by relay 1214, he releases the start key 1315 which in turn releases relay 1201 and all relays locked under its control, thereby restoring the circuit to normal.

Miscellaneous tests

If it is desired to test a particular sender, the key corresponding to key 511 belonging to the sender selector having access to the desired sender is operated. Assuming that key 511 is the one operated, the previously described circuit for operating relays 558 and 559 and the corresponding relays of the intermediate selectors is opened, but a circuit is closed for operating relays 508 and 509 over the lower contact of key 511, normal contacts of the intermediate keys and key 561, normal contact of relay 1213 to grounded conductor 1224 which will be effective after the start key is operated. The operation of key 511 also opens the circuit for operating magnet 507 under the control of relay 1215, but a circuit is provided over the upper contact of key 511 to stepping key 1325 and over the normal contact of start key 1315 to ground at the left back contact of relay 1309 so that the selector may be stepped into engagement with the desired sender. When the start key is operated, relays 508 and 509 can operate permitting the test to proceed. If the remaining senders are to be tested, key 511 can be released and the sender selector will advance following the test of the particular sender.

If it is desired to test only those senders which are idle when connected with or become idle within a limited length of time, the automatic pass busy key 1326 may be operated. With this key operated, when relay 1204 operates under the control of the timing circuit as will be described hereinafter, it connects ground over its right front contact to key 1326, over the operated contact of that key, right back contact of relay 1309 to the winding of busy meter 1314 and battery. Meter 1314 records one busy sender passed by, and connects ground over its contact to the winding of relay 1307 and battery. Relay 1307 opens the circuit of relay 1215 causing it to release. Relay 1215 releases relays 1202, 1203, 1204, 1301 and 1302, in turn releasing the busy meter 1314 and releasing relay 1307. The stepping magnet 507 (or corresponding magnet of the sender selector in use at the time) is reoperated over the back contact of relay 1215 and this magnet and relay 1215 function as described to advance the sender selector to the next sender. With key 1326 normal, when the test circuit encounters a sender which remains busy an undue length of time, a circuit is closed by relay 1204 to key 1326 which extends over the normal contact of that key and the normal contact of key 1221 to the trouble meter 1313 which operates, in turn operating relay 1205 to light lamp 1226 and summon the attendant. The circuit may then be advanced by operating relay 1307 manually by the operation of advance key 1116.

If it is desired to repeat the test of a sender, key 1220 is operated. With this key operated the repeat test meter 1217 is substituted for the complete test meter 1216. It also opens the circuit of the stepping magnets and connects ground over the outer left front contact of relay 1201, right back contact of relay 1200, outer upper operated contact of key 1220 to the winding of relay 1206 and battery, holding that relay operated. When the sender restores to normal, relay 1209 is operated in the usual manner and the test continues until key 1220 is restored to normal. Register 1217 operates each time relay 1208 operates. Meter 1217 in operating closes a circuit for relay 1210 which locks over its front contact, inner right normal contact of key 1101 to conductor 1223 which is grounded by relay 1200. Relay 1210 holds the meter operating circuit opened until relay 1200 is released at the end of the test in turn releasing relay 1210, and is reoperated at the beginning of the next test. When key 1220 is restored, the sender advances to the next terminal at the end of a test and the test on the next sender proceeds as described.

If it is desired to hold a sender while trouble is being corrected, it may be done by operating the control advance key 1116 which operates relay 1307. Relay 1307 connects ground over its outer left front contact through a 30-ohm resistance 1327 to conductor 519 to hold the sender circuit busy. Relay 1307 also releases relay 1200, prevents the sender from advancing and operates relay 1308 if that relay is not already operated. When the trouble has been cleared, key 1116 is released, in turn releasing relay 1307 which closes the operating path for the stepping magnet to advance the selector to the next sender.

Key 312 supplies battery to the counting relay lamps 1041 to 1049 and the digit lamps 331 to 338. It also supplies battery to the progress lamps. These lamps are as follows: Sender busy lamp 327 receives ground over key 1315 operated and relay 1309 unoperated. Off-normal lamp 326 receives ground with relays 1310 and 1309 operated. Sender control lamp 325 receives ground over the back contact of relay 1304 and the front contact of relay 1309. Keying lamp 324 receives ground with relays 213, 1309, 1304 operated. Fundamental closure lamp 323 receives ground over the front contacts of relays 216, 1304 and 1309. Reverse battery lamp 322 receives ground over the front contact of relay 217. Ringing lamp 321 receives ground over the front contact of either relay 204 or 210 and of relays 1304 and 1309. Delayed digit lamp 320 receives ground over the front contact of relay 102. Over pulsing lamp 1050 receives ground from the front contact of relay 1009.

*Time alarm*

When start key 1315 is operated, relay 1201 operates, connecting ground to conductor 1227 leading to the timing circuit. Relay 1201 also operates relay 1215 as previously described and relay 1215 provides a locking circuit for the timing relays 1202, 1203, 1204, 1301 and 1302 which may be traced over the outer right front contact of relay 1215, left back contact of relay 1310, conductor 1219 to ground at the outer left contact of relay 1201. When the timing circuit connects ground to conductor 1228, it completes a circuit over the outer right front contact of relay 1201, right back contacts of relays 1302 and 1301 through the right winding of relay 1202 to battery. Relay 1202 locks under the control of relay 1215. After a predetermined interval, ground is connected to conductor 1229, completing a circuit over the right front contact of relay 1202, lower normal contact of relay 1318, upper normal contact of key 1221 to the winding of relay 1204 and battery. Relay 1204 also locks under the control of relay 1215. If key 1318 is operated, to prolong the timing interval, this connection of ground to conductor 1229 closes a circuit extending as traced to key 1318 and over the lower operated contact of key 1318, right back contact of relay 1203 to the right winding of relay 1301 and battery. Relay 1301 locks under the control of relay 1215. The next connection of ground to conductor 1228 operates relay 1203 over the back contact of relay 1302 and the front contact of relay 1301, and the next connection of ground to conductor 1229, operates relay 1302 over the front contact of relay 1203. The subsequent grounding of conductor 1228 operates relay 1204 over the front contact of relay 1302 and the outer upper normal contact of key 1221. Relay 1204, when operated, operates the trouble meter 1313 over the normal contact of the automatic pass-busy key 1326, and the meter operates relay 1205 lighting lamp 1226 and sounding an alarm. When the test man notes that lamp 1226 is lighted, he will operate key 1221 opening the operating circuit of relay 1204 so that the alarm can not function during the time when trouble is being located.

If the sender is selected before the time alarm has functioned, the holding path of the timing relays will be opened by the operation of relay 1310, if any of them have been operated. When relay 1309 operates another holding circuit for these relays is closed and they may reoperate under the control of the timing circuit. The time alarm is so arranged that it will function any time between eighteen and forty-eight seconds from the time ground is connected to conductor 1227. With key 1318 operated it will function any time between thirty-five and a hundred seconds.

When it is desired to make an observation of a particular test, the repeat key 1220 and the step-by-step key 1114 are operated and a plug attached to two keys is inserted in jack 1118. One key of these keys connects together the sleeve and tip and may be called the tip key while the other key connects the sleeve and ring together and may be called the ring key. The operation of key 1114 connects the tip of jack 1118 and key 1119 over the back contact of relay 310 to the winding of relay 309 and battery, and opens the conductor by which the test normally advances after each selection. Therefore, when the tip key or key 1119 is operated, relay 309 operates and when either key is released, relay 310 operates in the locking circuit of relay 309 which extends to ground under the control of relays 308 and 222. The operation of relay 310 connects ground to the armature of relay 303, starting the impulsing circuit. Relays 306 and 307 operate in response to the first pulse and relays 311 and 308 operate on the second pulse during which the digit is transmitted to the sender and after which the operation of relay 308 releases relays 309 and 310 stopping the test until key 1119 or the tip key is operated for the second digit. When the test man wishes to wipe out the call at the completion of a particular selection, or at any time, he may operate either key 1116 or the ring key, operating relay 1307 which locks under the control of relay 1309. Relay 1307 also opens the circuit of the stepping magnet and of relay 1215. When either key is released, after the sender becomes normal, relay 1307 releases and the test is repeated.

If start key 1315 should be released at any time during progress of the test, the test circuit will continue to the completion of that test, since relay 1291 locks under the control of relay 1200, which in turn is held operated under the control of relay 1304, the release of which is used to terminate the test as above described. The test circuit will then restore to normal leaving the selector standing on the last sender tested, but will not interfere with that sender while it is handling regular calls.

What is claimed is:

1. In a telephone system, register senders comprising a plurality of registers for receiving and controlling the transmission of the elements of telephone designations, a testing device for testing said senders including means for transmitting digits to said senders and means for receiving digits from said senders, a key for each digit, a pair of transfer relays for each digit, means for operating said relays to associate said keys with said transmitting means, and means for reoperating said relays to associate said keys with said receiving means.

2. In a telephone system, register senders comprising a plurality of registers for receiving and controlling the transmission of the elements of telephone designations, a testing device for testing said senders including means for transmitting digits to said senders and means for receiving digits from said senders, a key for each digit, a pair of transfer relays for each digit, means for successively operating said pairs of relays to associate said transmitting means with said keys in turn, and means for successively reoperating said relays to associate said receiving means with said keys in turn.

3. In a telephone system, register senders comprising a plurality of registers for receiving and controlling the transmission of the elements of telephone designations, a testing device for testing said senders including means for transmitting digits to said senders and means for receiving digits from said senders, a row of keys for each digit, a pair of transfer relays for each digit, means for operating said relays to associate said transmitting means with an operated one of said keys, and means for reoperating said relays to associate said key with said receiving means.

4. In a telephone system, register senders comprising a plurality of registers for receiving and controlling the transmission of the elements of telephone designations, a testing device for testing said senders including means for transmitting digits to said senders and means for receiving digits from said senders, a row of keys for each digit, a pair of transfer relays for each digit, means for successively operating said pairs of relays to associate said transmitting means with operated ones of said keys, and means for successively reoperating said relays to associate said receiving means with said keys in turn.

5. In a telephone system, register senders comprising a plurality of registers for receiving and controlling the transmission of the elements of telephone designations, a testing device for testing said senders including means for transmitting digits to said senders and means for receiving digits from said senders, a key for each digit, a pair of transfer relays for each digit, means responsive to the operation of one of said pairs of relays to associate a corresponding key with said transmitting means, means responsive to the operation of a succeeding pair of relays to release said first pair of relays, and means to delay the operation of said succeeding pair of relays and to associate said receiving means with said key under the control of said first set of relays.

6. In a telephone system, register senders comprising a plurality of registers for receiving and controlling the transmission of the elements of telephone designations, a testing device for testing said senders including means for transmitting digits to said senders and means for receiving digits from said senders, a key for each digit, a pair of transfer relays for each digit, means to operate said pairs of relays in succession to permit the transmission of a plurality of digits to said sender, and means to reoperate said pairs of relays in succession to successively receive the digits transmitted by said sender.

7. In a telephone system, register senders comprising a plurality of registers for receiving and controlling the transmission of the elements of telephone designations, a testing device for testing said senders including means for transmitting digits to said senders and means for receiving digits from said senders, means responsive to the transmission of a digit to cause the transmission of a succeeding digit or to prepare for the reception of the same digit, and means to determine whether a digit shall be received or transmitted.

8. In a telephone system, register senders comprising a plurality of registers for receiving and controlling the transmission of the elements of telephone designations, a testing device for testing said senders including means for transmitting digits to said senders and means for receiving digits from said senders, a key for each digit, a pair of transfer relays for each digit, means under the control of a pair of transfer relays for transmitting the corresponding digit, means responsive to the transmission of a digit to operate a succeeding pair of relays to cause the transmission of the next digit, other means responsive to the transmission of a digit to hold said pair of relays operated to receive said digit from said sender, and means to determine which pair of relays shall be controlled by said transmitting means.

9. In a telephone system, register senders comprising a plurality of registers for receiving and controlling the transmission of the elements of telephone designations, a testing device for testing said senders including means for transmitting digits to said senders and means for receiving digits from said senders, a key for each digit, a pair of transfer relays for each digit, means to operate said pairs of relays in succession to permit the transmission of a plurality of digits to said sender, means to reoperate said pairs of relays in succession to successively receive the digits transmitted by said sender, means in said sender to delay the transmission of certain digit until certain other digits have been received, and means in said test circuit for delaying the transmission of said certain other digits to test the ability of the sender to await said digits.

10. In a telephone system, register senders comprising a plurality of registers for receiving and controlling the transmission of the elements of telephone designations, a testing device for testing said senders including means for transmitting digits to said senders and means for receiving digits from said senders, a key for each digit, a pair of transfer relays for each digit, means to operate said pairs of relays in succession to permit the transmission of a plurality of digits to said sender, means to reoperate said pairs of relays in succession to successively receive the digits transmitted by said sender, means in said sender to delay the transmission of certain digits until certain other digits have been received, and means in said test circuit for delaying the transmission of said certain other digits to test the ability of the sender to await said digit, said means comprising a pair of auxiliary relays, a set of counting relays and means under the control of said auxiliary relays to operate said counting relays to determine the period of said delay.

11. In a telephone system, register senders comprising a plurality of registers for receiving and controlling the transmission of the elements of telephone designations, a testing device for testing said senders including means for transmitting digits to said senders and means for receiving digits from said senders, a key for each digit, a pair of transfer relays for each digit, means to operate said pairs of relays in succession to permit the transmission of a plurality of digits to a sender, means to reoperate said pairs of relays in succession to successively receive the digits transmitted by said sender, means to transmit a signal to said sender to prepare said sender to transmit digits, and means to determine whether said signal shall be transmitted before or after the transmission of digits to the sender.

12. In a telephone system, register senders comprising a plurality of registers for receiving and controlling the transmission of the elements of telephone designations, a testing device for testing said senders including means for transmitting digits to said senders and means for receiving digits from said senders, a key for each digit, a pair of transfer relays for each digit, means to operate said pairs of relays in succession to permit the transmission of a plurality of digits to a sender, means to reoperate said pairs of relays in succession to successively receive the digits transmitted by said sender, means to separately transmit the portions of a class indication having a plurality of portions, means responsive to the transmission of the complete class indication to prepare the sender for the transmission of impulses, and means to delay the transmission of a portion of said class indication until all of said digits have been transmitted to the sender.

13. In a telephone system, register senders comprising a plurality of registers for receiving and controlling the transmission of the elements of telephone designations, a testing device for testing said senders including means for transmitting digits to said senders and means for receiving digits from said senders, a key for each digit, a pair of transfer relays for each digit, means to operate said pairs of relays in succession to permit the transmission of a plurality of digits to a sender, means to reoperate said pairs of relays in succession to successively receive the digits transmitted by said sender, means to separately transmit the portions of a class indication having a plurality of portions, means responsive to the transmission of the complete class indication to prepare the sender for the transmission of impulses, and means to determine whether or not the transmission of a portion of said class indication shall be delayed until all of said digits have been transmitted to the sender.

14. In a telephone system, register senders comprising a plurality of registers for receiving and controlling the transmission of the elements of telephone designations, a testing device for testing said senders including means for transmitting digits to said senders and means for receiving digits from said senders, a key for each digit, a pair of transfer relays for each digit, means under the control of a pair of transfer relays for transmitting the corresponding digit, means responsive to the transmission of a digit to operate a succeeding pair of relays to cause the transmission of the next digit, other means responsive to the transmission of a digit to hold said pair of relays operated to receive said digit from said sender, means to separately transmit the portions of a class indication having a plurality of portions, means responsive to the complete transmission of said class indication to prepare said sender for the transmission of impulses, means to delay the transmission of a portion of said class indication until all of the digits of a designation have been transmitted to the sender, and means to determine whether said delay means or said other responsive means shall be effective.

15. In a telephone system, an impulser, and means for indicating the speed of said impulser comprising a relay responsive to said impulser, a series of counting relays under the control of said responsive relay and a lamp controlled by said counting relays.

16. In a telephone system, a register sender, a relay impulser in said sender, a testing device, means for associating said testing device with said sender, means to initiate the operation of said relay impulser, a series of counting relays, means to operate said counting relays repeatedly under the control of said impulser, and a lamp controlled by said counting relays for indicating the speed of said impulser.

17. In a telephone system, a register sender including a relay impulser, a testing device comprising means to transmit telephone designations to said register sender, means for receiving telephone designations from said sender as generated by said impulser, and means for controlling the operation of said testing device according as the transmitted and received designations correspond, and means for associating said impulser and said receiving means independent of said transmitting means and said control means to test the speed of said impulser.

18. In a telephone system, a register sender comprising a plurality of registers, means for setting said registers under the control of incoming digit impulses, a relay impulser, and means to transmit digit impulses from said impulser under the control of said registers, a testing device comprising a plurality of registers, means for transmitting digit impulses to said sender under the control of said test registers, means for receiving said digit impulses from said sender, a series of counting relays, said test registers, receiving means and counting relays cooperating to control the continued operation of said testing device, means individual to said sender for causing the continued operation of said relay impulser independent of said sender registers, means in said testing device for rendering said counting relays responsive to impulses from said impulser independent of test registers and a lamp for indicating the speed of operation of said impulser.

19. In a telephone system, register senders comprising a plurality of registers for receiving and controlling the transmission of the elements of telephone designations, class recording means for indicating whether the number of digits to be received is fixed or variable, transmitting means, first means responsive to the recording of said fixed number of digits to initiate the operation of said transmitting means, other means responsive to the recording of a start designation for initiating the operation of said transmitting means, means under the control of said class recording means to render either said first initiating means or said other initiating means effective, and means under the control of said class recording means when operated to indicate that a fixed number of digits is to be received to render said other means effective to transmit a release signal, a testing device, means for associating said testing device with one of said senders, means to transmit a fixed class designation to said sender, means to transmit a designation to said sender comprising less than said fixed number of digits and said start signal, and means responsive to said release signal from said sender to associate said testing device with another sender.

20. In a telephone system, register senders comprising a plurality of registers for receiving and controlling the transmission of the elements of telephone designations, class recording means, transmitting means, means responsive to the recording of a start designation for initiating the operation of said transmitting means, means under the control of said class recording means to render said start signal effective only when recorded on particular registers, and means under the control of said class recording means responsive to the registration of said start signal on any other of said registers to transmit a release signal, a testing device, means for associating said testing device with one of said senders, means to transmit a class designation to said sender, means to transmit a designation to said sender including a number of digits and said start signal such as to record said start signal on one of said other registers, and means responsive to said release signal from said sender to associate said testing device with another sender.

21. In a telephone system, register senders comprising a plurality of registers for receiving and controlling the transmission of the elements of telephone designations, class recording means for indicating whether the number of digits to be received is fixed or variable, transmitting means and means under the control of said class recording means to render said transmitting means responsive to the registration of said fixed number of digits, a testing device for testing said senders including means for transmitting digits to said senders and means for receiving digits from said senders, a plurality of class keys, means for terminating the operation of said transmitting means, and means to operate said terminating means under the control of said class keys.

22. In a telephone system, register senders comprising a plurality of registers for receiving and controlling the transmission of the elements of telephone designations, class recording means for indicating whether the number of digits to be received is fixed or variable, transmitting means and means under the control of said class recording means to render said transmitting means responsive to the registration of said fixed number of digits or to a start signal, a testing device for testing said senders including means for transmitting digits to said senders and means for receiving digits from said senders, a keyset for controlling said transmitting and receiving operations, means controlled by said keyset for transmitting said start signal, a plurality of class keys, means for terminating the operation of said transmitting means, and means to place the operation of said terminating means either under the control of said keys or under the control of said keyset.

23. In a telephone system, register senders comprising a plurality of registers for receiving and controlling the transmission of the elements of telephone designations, class recording means, transmitting means and means under the control of said class recording means to determine whether said transmitting means shall be made effective to transmit a digit following the registration of said digit or following the registration of a subsequent digit, a testing device for testing said senders including means for sending digits to said senders and means for receiving digits from said senders, a plurality of class keys, means under the control of said class keys for operating said class recording means, means to render said sending means and said receiving means alternately effective, means to operate said sending means to send two digits in succession, means for introducing a time interval between successive operations of said sending means, and means under the control of said class keys to determine whether said sending means and said receiving means shall be alternately effective or said sending means shall send two digits separated by a time interval.

24. In a telephone system, register senders comprising a plurality of registers for receiving and controlling the transmission of the elements of telephone designations, class recording means, transmitting means and means under the control of said class recording means to determine whether said transmitting means shall be made effective to transmit a digit following the registration of said digit or following the registration of a subsequent digit, a testing device for testing said senders including means for sending digits to said senders and means for receiving digits from said senders, a plurality of class keys, means under the control of said class keys for operating said class recording means, means to render said sending means and said receiving means alternately effective, means to operate said sending means to send two digits in succession, means for introducing a predetermined time interval between successive operations of said sending means, means under the control of said class keys to determine whether said sending means and said receiving means shall be alternately effective or said sending means shall send two digits separated by a time interval, and means under the control of said receiving means during said predetermined time interval to prevent the sending of said subsequent digit.

25. In a telephone system, register senders comprising a plurality of registers for receiving and controlling the transmission of the elements of telephone designations, class recording means, transmitting means and means under the control of said class recording means to determine whether said transmitting means shall be made effective to transmit a digit following the registration of said digit or following the registration of a subsequent digit, a testing device for testing said senders including means for sending digits to said senders and means for receiving digits from said senders, means normally effective to render said sending means and said receiving means alternately effective, a set of delay relays, means under the control of said class keys to determine whether said delay relays shall be operated, and means under the control of said delay relays to render said receiving means ineffective to receive a particular digit until after a measured time interval and the sending of a subsequent digit.

26. In a telephone system, register senders comprising a plurality of registers for receiving and controlling the transmission of the elements of telephone designations, class recording means, transmitting means and means under the control of said class recording means to determine whether said transmitting means shall be made effective to transmit a digit following the registration of said digit or following the registration of a subsequent digit, a testing device for testing said senders including means for sending digits to said senders and means for receiving digits from said senders, means normally effective to render said sending means and said receiving means alternately effective, a set of delay relays, means under the control of said class keys to determine whether said delay relays shall be operated, means under the control of said delay relays to render said receiving means ineffective to receive a particular digit until after a measured time interval and the sending of a subsequent digit, and means under the control of said receiving means during said measured time interval to prevent the sending of said subsequent digit.

RALPH E. HERSEY.